(12) United States Patent
Shimozawa et al.

(10) Patent No.: US 10,100,190 B2
(45) Date of Patent: Oct. 16, 2018

(54) THERMOPLASTIC RESIN COMPOSITION

(71) Applicant: TORAY INDUSTRIES, INC., Tokyo (JP)

(72) Inventors: Taku Shimozawa, Ichihara (JP); Masafumi Koyama, Tokyo (JP); Kosuke Shirotani, Ichihara (JP)

(73) Assignee: TORAY INDUSTRIES, INC., Tokyo (JP)

( * ) Notice: Subject to any disclaimer, the term of this patent is extended or adjusted under 35 U.S.C. 154(b) by 154 days.

(21) Appl. No.: 15/108,700

(22) PCT Filed: Jan. 29, 2015

(86) PCT No.: PCT/JP2015/052540
§ 371 (c)(1),
(2) Date: Jun. 28, 2016

(87) PCT Pub. No.: WO2015/119040
PCT Pub. Date: Aug. 13, 2015

(65) Prior Publication Data
US 2016/0333178 A1     Nov. 17, 2016

(30) Foreign Application Priority Data

Feb. 6, 2014  (JP) ................................. 2014-021132
Sep. 1, 2014  (JP) ................................. 2014-176745
Sep. 30, 2014 (JP) ................................. 2014-199543

(51) Int. Cl.
*C08L 51/04*    (2006.01)
*C08F 265/06*   (2006.01)
(Continued)

(52) U.S. Cl.
CPC ............ *C08L 51/04* (2013.01); *C08F 265/04* (2013.01); *C08F 265/06* (2013.01); *C08J 5/00* (2013.01);
(Continued)

(58) Field of Classification Search
CPC ....................................................... C08L 51/04
See application file for complete search history.

(56) References Cited

U.S. PATENT DOCUMENTS 6,136,901 A * 10/2000 Hashitani ............. C08K 5/1515
524/109
2012/0322945 A1* 12/2012 Tomita ................. C08F 265/04
525/73

FOREIGN PATENT DOCUMENTS

JP          6-299044 A    10/1994
JP          8-113690 A    5/1996
(Continued)

OTHER PUBLICATIONS

International Search Report, issued in PCT/JP2015/052540, PCT/ISA/210, dated Apr. 21, 2015.
(Continued)

*Primary Examiner* — Arrie L Reuther
(74) *Attorney, Agent, or Firm* — Birch, Stewart, Kolasch & Birch LLP

(57) ABSTRACT

A thermoplastic resin composition comprising a graft copolymer (I) which is produced by carrying out the graft polymerization of a monomer mixture (B) comprising an aromatic vinyl monomer and a vinyl cyanide monomer in the presence of an acrylic rubbery polymer (A) and a vinyl copolymer (II) which is produced by carrying out the copolymerization of an aromatic vinyl monomer with a vinyl cyanide monomer, wherein the ratio of the content of the former copolymer to that of the latter copolymer is (30 to 70 parts by weight):(70 to 30 parts by weight), the graft copolymer (I) has such a property that the ratio (i.e., ($\alpha$)/($\beta$)) of the gel swelling degree ($\alpha$) of the acrylic rubbery polymer (A) in toluene to the grafting ratio ($\beta$) of the graft copolymer (I) is 0.4 to 2.0, and the thermoplastic resin composition has such a structure that particles of the graft copolymer (I) are (Continued)

aggregated in the thermoplastic resin composition. From the thermoplastic resin composition, a molded article having excellent fluidability, weather resistance and impact resistance can be produced.

11 Claims, 2 Drawing Sheets

(51) Int. Cl.
*C08L 25/12* (2006.01)
*C08F 265/04* (2006.01)
*C08J 5/00* (2006.01)
*C08L 33/26* (2006.01)

(52) U.S. Cl.
CPC .............. *C08L 25/12* (2013.01); *C08L 33/26* (2013.01); *C08J 2333/26* (2013.01); *C08J 2351/04* (2013.01); *C08J 2433/26* (2013.01); *C08J 2451/04* (2013.01); *C08L 2201/02* (2013.01); *C08L 2201/08* (2013.01); *C08L 2203/20* (2013.01); *C08L 2205/03* (2013.01); *C08L 2207/04* (2013.01)

(56) References Cited

FOREIGN PATENT DOCUMENTS

| JP | 2003-20377 A | 1/2003 |
| JP | 2007-191618 A | 8/2007 |
| JP | 2013-35887 A | 2/2013 |
| WO | WO 2011/108486 A1 | 9/2011 |

OTHER PUBLICATIONS

Written Opinion of the International Searching Authority, issued in PCT/JP2015/052540, PCT/ISA/237, dated Apr. 21, 2015.

* cited by examiner

[Fig 1]
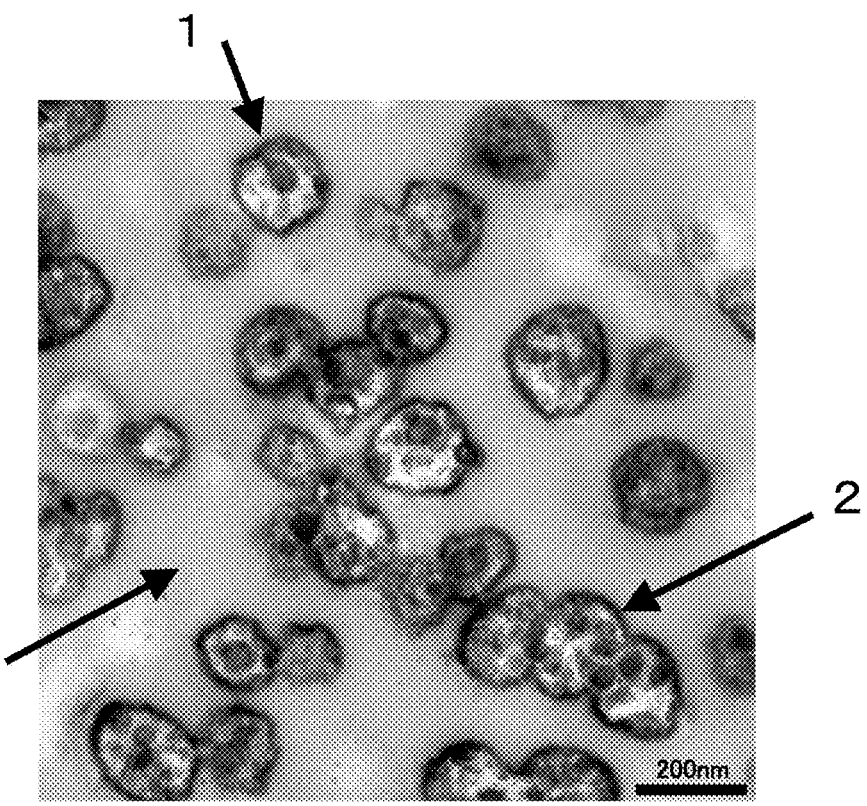
[Fig 2]
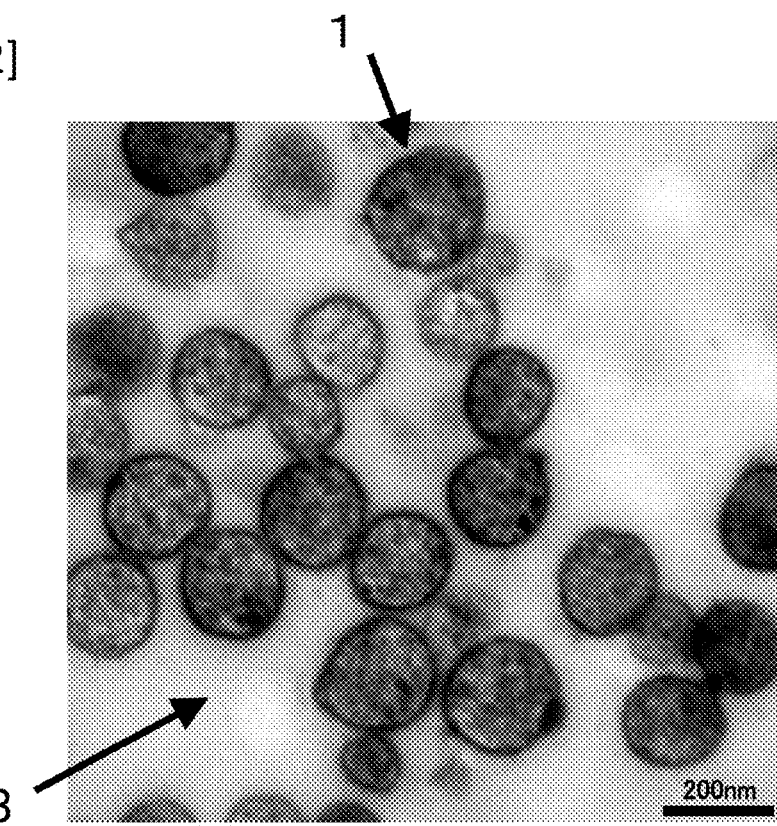

[Fig 3]
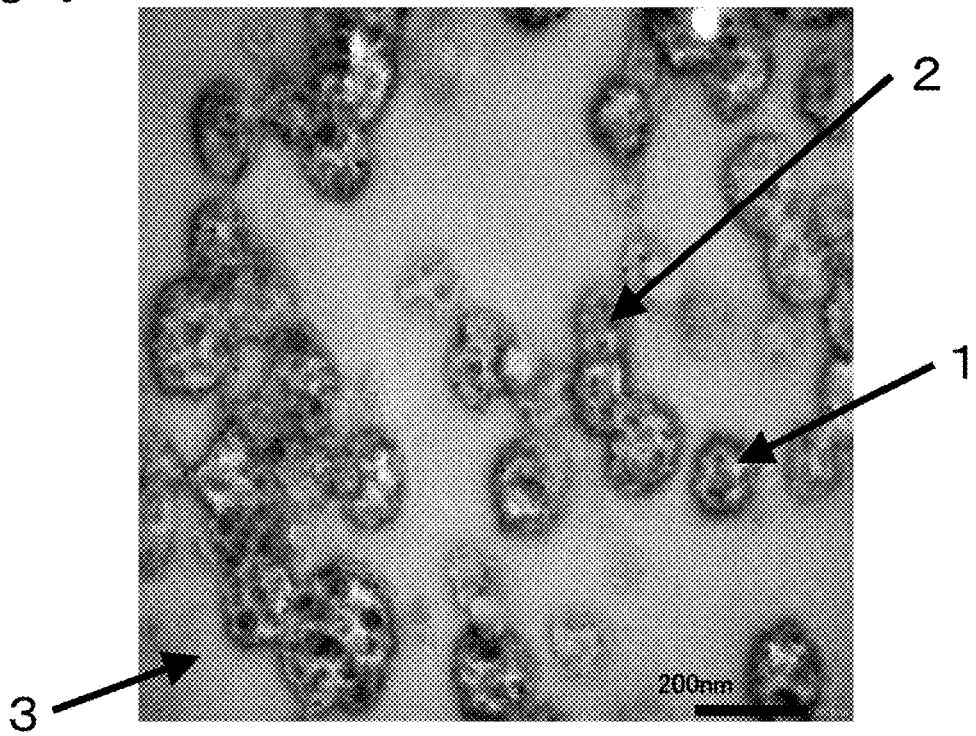
[Fig 4]
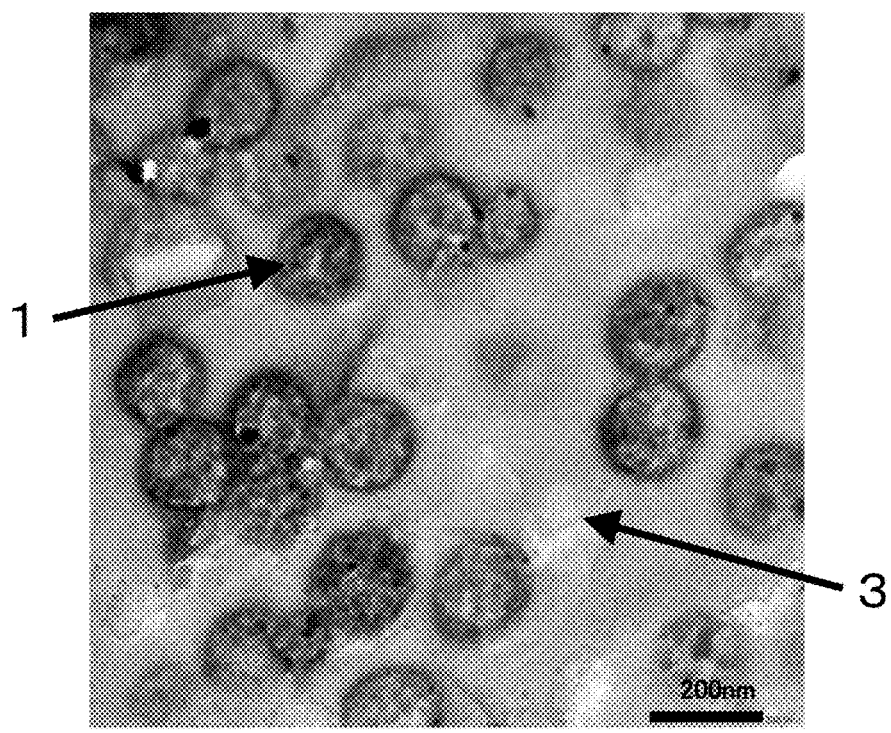

THERMOPLASTIC RESIN COMPOSITION

TECHNICAL FIELD

The present invention relates to a thermoplastic resin composition including a graft copolymer and a vinyl-based copolymer.

BACKGROUND ART

An acrylonitrile-butadiene-styrene (ABS) resin obtained by polymerizing a diene-based rubbery polymer, an aromatic vinyl-based monomer, vinyl cyanide-based monomer and so on is excellent in impact resistance, moldability, outer appearance and the like, and is widely used in various applications such as office automation equipment, home electric appliances and miscellaneous goods. However, since the ABS resin has many chemically unstable double bonds in the main chain of the polymer, it is easily degraded by ultraviolet rays and the like, and is poor in weather resistance, and therefore difficult to use outdoors. Accordingly, a method using a saturated rubbery polymer having no double bond in the main chain has been proposed, and as a typical example thereof, an acrylonitrile-styrene-acrylate (ASA) resin produced using an acryl-based rubbery polymer is known. While the acryl-based rubbery polymer which is a saturated rubber is stable to ultraviolet rays, and thus has excellent weather resistance, it has the problem that its impact resistance is lower as compared to that of the ABS resin.

In this connection, as a thermoplastic resin composition excellent in impact resistance, rigidity and outer appearance, for example, there has been proposed a thermoplastic resin composition containing an acrylic rubber-based graft copolymer obtained by graft-polymerizing a vinyl-based monomer in the presence of a rubbery polymer including acrylic acid ester-based monomer units and polyfunctional monomer units, wherein the total amount of the polyfunctional monomer units in the rubbery polymer is 0.3 to 3 parts by mass based on 100 parts by mass of the acrylic acid ester-based monomer units, and the graft copolymer includes 30 to 95% by mass of polyfunctional monomer units having two unsaturated bonds and 5 to 70% by mass of polyfunctional monomer units having three unsaturated bonds in 100% by mass of the total of the polyfunctional monomer units (see, for example, Patent Document 1).

As a method for producing a thermoplastic resin excellent in impact resistance, and outer appearance such as glossiness and color development, for example, there has been proposed a method for producing an impact-resistant thermoplastic resin in which 10 to 95 parts by weight of a monomer including a polyfunctional monomer is blended and polymerized in the presence of 5 to 90 parts by weight of a graft polymer rubber (A) obtained by emulsification-polymerizing 60 to 95 parts by weight of a polymerizable monomer (a) containing an acrylic acid ester having an alkyl group with a carbon number of 1 to 13 in the presence of 5 to 40 parts by weight of a diene-based polymer (b) (see, for example, Patent Document 2).

As a thermoplastic resin composition excellent in color development, weather resistance, impact resistance and processability, for example, there has been proposed a thermoplastic resin composition including 10 to 80 parts by weight of a graft copolymer obtained by graft-polymerizing a vinyl-based monomer with an acrylic acid ester-based rubber polymer, and 20 to 90 parts by weight of a styrene-based copolymer, the acrylic acid ester rubber polymer being a rubber polymer produced by a particle expansion method using an acid group-containing latex (see, for example, Patent Document 3).

As a thermoplastic resin composition which is excellent in impact resistance, fluidity and surface gloss and which is freed from bronzing phenomenon, for example, there has been proposed a thermoplastic resin composition which includes 10 to 100% by weight of a graft copolymer obtained by graft-polymerizing a vinyl-based monomer in the presence of an acryl-based rubber including 20 to 80% by weight of an acryl-based rubber of less than 0.2μ and 20 to 80% by weight of an acryl-based rubber of 0.2 to 0.6μ, and 0 to 90% by weight of a copolymer formed from a vinyl-based monomer (see, for example, Patent Document 4).

Generally, for using resin materials in home electric appliances and office automation equipment, flame retardancy may be required, and since most of resin compositions containing the ABS resin are flammable, various techniques for making the ABS resin flame-retardant have been devised. As a method for making an ABS resin composition flame-retardant, a method is most widely employed in which an organic halogen compound having high frame retardation efficiency is blended in a resin to make the ABS resin composition flame-retardant. However, there is the problem that weather resistance is outstandingly reduced when flame retardancy is imparted to the ABS resin using an organic halogen compound. In this connection, there has been a flame-retardant thermoplastic resin composition including an organic halogen compound and a yellow pigment has been proposed (see, for example, Patent Document 5).

PRIOR ART DOCUMENTS

Patent Documents

Patent Document 1: US Patent Application Publication No. 2013/0345362
Patent Document 2: Japanese Patent Laid-open Publication No. 8-41143
Patent Document 3: Japanese Patent Laid-open Publication No. 11-116767
Patent Document 4: Japanese Patent Laid-open Publication No. 2000-17135
Patent Document 5: Japanese Patent Laid-open Publication No. 9-235444

SUMMARY OF THE INVENTION

Problems to be Solved by the Invention

However, the thermoplastic resin composition proposed in Patent Document 1 has the problem that the balance between impact resistance and fluidity is still insufficient.

The impact-resistance thermoplastic resin obtained by the production method proposed in Patent Document 2 has the problem that weather resistance is insufficient.

The thermoplastic resin composition proposed in Patent Document 3 has the problem that fluidity is still insufficient.

The thermoplastic resin composition proposed in Patent Document 4 has the problem that the balance between impact resistance and fluidity is still insufficient.

The thermoplastic resin composition obtained by the technique proposed in Patent Document 5 has the problem that weather resistance is insufficient.

In view of the conventional techniques described above, an object of the present invention is to provide a thermoplastic resin composition which is excellent in fluidity and ensures that a molded article excellent in weather resistance and impact resistance can be obtained.

Solutions to the Problems

As a result of extensively conducting studies for achieving the above-mentioned object, it has been found that when in a thermoplastic resin composition, particles of a graft copolymer (I) obtained from an acryl-based rubbery polymer (A) are aggregated to form pseudo-large particles, the thermoplastic resin composition is excellent in fluidity, and ensures that a molded article excellent in balance between weather resistance and impact resistance can be obtained, leading to the present invention.

Specifically, it has been found that the above-mentioned object is achieved with the following configurations.

[1] A thermoplastic resin composition including: a graft copolymer (I) obtained by graft-polymerizing a monomer mixture (B) containing an aromatic vinyl-based monomer and a vinyl cyanide-based monomer in the presence of an acryl-based rubbery polymer (A) which is obtained by copolymerizing 97 to 99.5% by weight of an acrylic acid ester-based monomer (a) and 0.5 to 3% by weight of a polyfunctional monomer (b) and has a volume average particle size of 0.10 to 0.3 μm; and a vinyl-based copolymer (II) obtained by copolymerizing at least an aromatic vinyl-based monomer and a vinyl cyanide-based monomer, the thermoplastic resin composition containing 30 to 70 parts by weight of the graft copolymer (I) and 30 to 70 parts by weight of the vinyl-based copolymer (II) based on 100 parts by weight of the total of the graft copolymer (I) and the vinyl-based copolymer (II), wherein the graft copolymer (I) satisfies the following formula (1) for the ratio of a gel swelling degree (α) of the acryl-based rubbery polymer (A) in toluene to a graft ratio (β) of the graft copolymer (I) ((α)/(β)), and particles of the graft copolymer (I) are aggregated in the thermoplastic resin composition.

$$0.4 \leq (\alpha)/(\beta) \leq 2.0 \quad (1)$$

[2] The thermoplastic resin composition according to [1], wherein the gel swelling degree of the acryl-based rubbery polymer (A) in toluene is 10 or more times.

[3] The thermoplastic resin composition according to [1] or [2], wherein the graft ratio of the graft copolymer (I) is 5 to 40%.

[4] The thermoplastic resin composition according to any one of [1] to [3], which includes 1 part by weight or more of a flame retardant (III) based on 100 parts by weight of the total of the graft copolymer (I) and the vinyl-based copolymer (II).

[5] The thermoplastic resin composition according to [4], wherein the flame retardant (III) contains an organic halogen compound.

[6] The thermoplastic resin composition according to [5], wherein the organic halogen compound contains a brominated epoxy resin and/or an oligomer thereof.

[7] The thermoplastic resin composition according to [6], wherein the brominated epoxy resin and/or oligomer thereof have epoxy groups on both ends thereof.

[8] A molded article, which is obtained by molding the thermoplastic resin composition according to any one of [1] to [7].

Effects of the Invention

The thermoplastic resin composition of the present invention is excellent in fluidity. A molded article excellent in weather resistance and impact resistance can be obtained from the thermoplastic resin composition of the present invention.

Further, according to a preferred aspect of the present invention, there can be provided a thermoplastic resin composition which is excellent in fluidity and ensures that a molded article excellent in weather resistance, impact resistance and flame resistance can be obtained.

BRIEF DESCRIPTION OF THE DRAWINGS

FIG. 1 shows an image when a thermoplastic resin composition of the present invention obtained in Example 101 is observed with a transmission electron microscope.

FIG. 2 shows an image when a thermoplastic resin composition obtained in Comparative Example 102 is observed with a transmission electron microscope.

FIG. 3 shows an image when a thermoplastic resin composition of the present invention obtained in Example 207 is observed with a transmission electron microscope.

FIG. 4 shows an image when a thermoplastic resin composition obtained in Comparative Example 202 is observed with a transmission electron microscope.

EMBODIMENTS OF THE INVENTION

A thermoplastic resin composition of the present invention includes 30 to 70 parts by weight of a graft copolymer (I) and 30 to 70 parts by weight of a vinyl-based copolymer (II) based on 100 parts by weight of the total of the graft copolymer (I) and the vinyl-based copolymer (II). The impact resistance and weather resistance of a molded article can be improved by including the graft copolymer (I), and the fluidity of the thermoplastic resin composition can be improved by including the vinyl-based copolymer (II). The graft copolymer (I) is obtained by graft-copolymerizing a monomer mixture (B) containing an aromatic vinyl-based monomer and a vinyl cyanide-based monomer in the presence of an acryl-based rubbery polymer (A). The acryl-based rubbery polymer (A) is a copolymer which is obtained by copolymerizing 97 to 99.5% by weight of an acrylic acid ester-based monomer (a) and 0.5 to 3% by weight of a polyfunctional monomer (b) and has a volume average particle size of 0.10 to 0.3 μm.

In the present invention, the acrylic acid ester-based monomer (a) that forms the acryl-based rubbery polymer (A) is preferably one having an alkyl group with a carbon number of 1 to 10, and examples thereof include methyl acrylate, ethyl acrylate, n-butyl acrylate, t-butyl acrylate and octyl acrylate. Two or more thereof may be used. Among them, n-butyl acrylate is preferred.

The polyfunctional monomer (b) that forms the acryl-based rubbery polymer (A) is not particularly limited as long as it has two or more functional groups, and examples of the functional groups include groups having a carbon-carbon double bond, such as an allyl group and a (meth)acryloyl group. Examples of the polyfunctional monomer (b) include allyl-based compounds such as allyl acrylate, allyl methacrylate, diallyl maleate, triallyl cyanurate and triallyl isocyanurate, and di(meth)acrylic acid ester-based compounds such as divinyl benzene, ethylene glycol dimethacrylate, diethylene glycol dimethacrylate and propylene glycol dimethacrylate. Two or more thereof may be used. Among them, allyl methacrylate is preferred because the gel swelling degree of the acryl-based rubbery polymer (A) in toluene and the graft ratio of the graft copolymer (I) as described later are each easily adjusted to be in a desired range.

The acryl-based rubbery polymer (A) in the present invention is obtained by copolymerizing 97 to 99.5% by weight of the acrylic acid ester-based monomer (a) and 0.5 to 3% by weight of the polyfunctional monomer (b) based on 100% by weight of the total of the acrylic acid ester-based monomer (a) and the polyfunctional monomer (b). When the ratio of the acrylic acid ester-based monomer (a) is less than 97% by weight, and the ratio of the polyfunctional monomer (b) is more than 3% by weight, the later-described gel swelling degree of the acryl-based rubbery polymer (A) in toluene decreases, so that the later-described graft ratio of the graft copolymer (I) increases. As a result, the fluidity of the molded article is reduced, and further, it is difficult to have a structure in which particles of the graft copolymer (I) are aggregated, so that the impact resistance of the molded article is reduced. It is preferred that the ratio of the acrylic acid ester-based monomer (a) is 98% by weight or more, and the ratio of the polyfunctional monomer (b) is 2% by weight or less, and it is more preferred that the ratio of the acrylic acid ester-based monomer (a) is more than 98.5% by weight, and the ratio of the polyfunctional monomer (b) is less than 1.5% by weight. On the other hand, when the ratio of the acrylic acid ester-based monomer (a) is more than 99.5% by weight, and the ratio of the polyfunctional monomer (b) is less than 0.5% by weight, the later-described graft ratio of the graft copolymer (I) decreases, so that the impact resistance of the molded article is reduced. The ratio of the acrylic acid ester-based monomer (a) is preferably 99.3% by weight or less, more preferably 99.0% by weight or less. The ratio of the polyfunctional monomer (b) is preferably 0.7% by weight or more, more preferably 1.0% by weight or more.

In the present invention, the volume average particle size of the acryl-based rubbery polymer (A) is in the range of 0.10 to 0.3 μm. When the volume average particle size of the acryl-based rubbery copolymer (A) is less than 0.10 μm, primary particles in aggregated particles as described later can no longer maintain their original form, and therefore the impact resistance of the molded article is reduced. The volume average particle size of the acryl-based rubbery polymer (A) is preferably 0.15 μm or more. When the volume average particle size of the acryl-based rubbery copolymer (A) is more than 0.3 μm, the dispersibility of the graft copolymer (I) in the thermoplastic resin composition is deteriorated, and therefore the impact resistance of the molded article is reduced. The volume average particle size of the acryl-based rubbery polymer (A) is preferably 0.25 μm or less.

The volume average particle size of the acryl-based rubbery polymer (A) can be measured using a laser scattering/diffraction particle size distribution measuring apparatus with an acryl-based rubbery polymer (A) latex dispersed in water.

The volume average particle size of the acryl-based rubbery polymer (A) can be adjusted to be in a desired range by, for example, the amounts of water, an emulsifier and a polymerization initiator which are used for polymerization.

As a method for expanding particles of the acryl-based rubbery polymer (A), a technique is known in which an organic acid or an acid group-containing latex is added in an acryl-based rubbery polymer (A) latex. Here, the acid group-containing latex is a latex obtained using an unsaturated acid monomer and an unsaturated carboxylic acid alkyl ester monomer. However, mere expansion of particles of the acryl-based rubbery polymer (A) using the above-mentioned technique does not lead to formation of the "structure in which particles of the graft copolymer (I) are aggregated" according to the present invention.

When an organic acid or an acid group-containing latex is added into an acryl-based rubbery polymer (A) latex, it is important that the added amount of the organic acid is 0 to 1 parts by weight based on 100 parts by weight of the acryl-based rubbery polymer (A). It is important that the added amount of the acid group-containing latex ensures that an unsaturated acid in the acid group-containing latex accounts for 0 to 0.5 parts by weight based on 100 parts by weight of the acryl-based rubbery polymer (A).

The gel swelling degree ($\alpha$) of the acryl-based rubbery polymer (A) in toluene is preferably 10 or more times. The gel swelling degree ($\alpha$) is an index expressing the cross-linking degree of the acryl-based rubbery polymer (A), and when the gel swelling degree ($\alpha$) is 10 or more times, particles of the graft copolymer (I) are easily aggregated, so that the fluidity of the thermoplastic resin composition and the impact resistance of the molded article can be further improved. The gel swelling degree ($\alpha$) of the acryl-based rubbery polymer (A) in toluene is more preferably 12 or more.

The gel swelling degree ($\alpha$) of the acryl-based rubbery polymer (A) in toluene can be determined by the following method. First, in the case of an acryl-based rubbery polymer (A) latex, the latex and sulfuric acid are added in methanol, and the mixture is then dehydrated and washed to obtain a solid of the acryl-based rubbery polymer (A). The resulting solid of the acryl-based rubbery polymer (A) is vacuum-dried at 80° C. for 3 hours, a predetermined amount of the solid is then immersed in toluene for 24 hours, and the weight (y) of the swollen sample is measured. Subsequently, the sample is vacuum-dried at 80° C. for 3 hours, and the weight (z) of the dried sample is then measured. The gel swelling degree ($\alpha$) is calculated from the weight (y) of the swollen sample and the weight (z) of the dried sample by the following equation.

$$\text{Gel swelling degree(times)}=(y)/(z).$$

The gel swelling degree of the acryl-based rubbery polymer (A) in toluene can be adjusted to be in a desired range by, for example, the amounts of a polyfunctional monomer, an emulsifier and an initiator which are used for polymerization. For example, for the polymerization ratio of the polyfunctional monomer, it is preferred that the ratio of the acrylic acid ester-based monomer (a) is more than 98.5% by weight, and the ratio of the polyfunctional monomer (b) is less than 1.5% by weight.

The gel content of the acryl-based rubbery polymer (A) in toluene is preferably 80 to 98%. When the gel content is 80% or more, the elasticity of the acryl-based rubbery polymer (A) is improved, so that the impact resistance of the molded article can be further improved. The gel content is preferably 85% or more. On the other hand, when the gel content is 98% or less, the elasticity of the acryl-based rubbery polymer (A) is improved, so that the impact resistance of the molded article can be further improved. The gel content is preferably 95% or less.

The gel content of the acryl-based rubbery polymer (A) in toluene can be determined by the following method. First, in the case of an acryl-based rubbery polymer (A) latex, the latex and sulfuric acid are added in methanol, and the mixture is then dehydrated and washed to obtain a solid of the acryl-based rubbery polymer (A). The resulting solid of the acryl-based rubbery polymer (A) is vacuum-dried at 80° C. for 3 hours, a predetermined amount (x) of the solid is immersed in toluene for 24 hours, and the weight (y) of the swollen sample is measured. Subsequently, the sample is vacuum-dried at 80° C. for 3 hours, and the weight (z) of the dried sample is then measured. The gel content is calculated from the weight (x) of the sample and the weight (z) of the dried sample by the following equation.

Gel content (%)=([z]/[x])×100.

The gel content of the acryl-based rubbery polymer (A) can be adjusted to be in a desired range by, for example, the amounts of a polyfunctional monomer, an emulsifier and an initiator which are used for polymerization.

As a method for polymerizing the acryl-based rubbery polymer (A), any method such as an emulsion polymerization method, a suspension polymerization method, a continuous bulk polymerization method or a solution continuous polymerization method can be used, and two or more of these methods may be combined. Among them, an emulsion polymerization or a bulky polymerization method is preferred. An emulsion polymerization method is most preferred because the volume average particle size is easily adjusted to be in a desired range by heat removal during polymerization.

The emulsifier to be used in the emulsion polymerization method is not particularly limited, and various kinds of surfactants can be used. As the surfactant, an anionic surfactant of carboxylic acid salt type, sulfuric acid ester salt type, sulfonic acid salt type or the like is preferably used. Two or more thereof may be used.

Specific examples of the anionic surfactant include caprylic acid salts, capric acid salts, lauric acid salts, myristic acid salts, palmitic acid salts, stearic acid salts, oleic acid salts, linoleic acid salts, linolenic acid salts, rosin acid salts, behenic acid salts, castor oil sulfuric acid ester salts, lauryl alcohol sulfuric acid ester salts, dodecyl benzene sulfonic acid salts, alkyl naphthalene sulfonic acid salts, alkyl diphenyl ether disulfonic acid salts, naphthalene sulfonic acid salt condensates, dialkyl sulfosuccinic acid salts, polyoxyethylene lauryl sulfuric acid salts, polyoxyethylene alkyl ether sulfuric acid salts and polyoxyethylene alkyl phenyl ether sulfuric acid salts. Examples of the salt mentioned here include alkali metal salts such as ammonium salts, sodium salts, lithium salts and potassium salts.

The initiator to be used for polymerization is not particularly limited, a peroxide, an azo-based compound or a persulfuric acid salt is used.

Specific examples of the peroxide include benzoyl peroxide, cumene hydroperoxide, dicumyl peroxide, diisopropylbenzene hydroperoxide, t-butyl hydroperoxide, t-butyl peroxyacetate, t-butyl peroxybenzoate, t-butyl isopropyl carbonate, di-t-butyl peroxide, t-butyl peroctate, 1,1-bis(t-butylperoxy)-3,3,5-trimethylcyclohexane, 1,1-bis(t-butylperoxy)cyclohexane and t-butylperoxy-2-ethyl hexanoate.

Specific examples of the azo-based compound include azobisisobutyronitrile, azobis(2,4-dimethylvaleronitrile, 2-phenylazo-2,4-dimethyl-4-methoxyvaleronitrile, 2-cyano-2-propylazoformamide, 1,1'-azobiscyclohexane-1-carbonitrile, azobis(4-methoxy-2,4-dimethylvaleronitrile), dimethyl 2,2'-azobisisobutyrate, 1-t-butylazo-2-cyanobutane, and 2-t-butylazo-2-cyano-4-methoxy-4-methylpentane.

Specific examples of the persulfuric acid salt include potassium persulfate, sodium persulfate and ammonium persulfate.

Two or more of these initiators may be used. For the emulsion polymerization method, potassium persulfate, cumen hydroperoxide or the like is preferably used. The initiator can also be used in a redox system.

For adjusting each of the volume average particle size of the acryl-based rubbery polymer (A), and the gel swelling degree and gel content of the acryl-based rubbery polymer (A) in toluene to be in the preferred range, it is preferred to use 80 to 200 parts by weight of water, 1.5 to 5 parts by weight of the emulsifier and 0.05 to 0.5 parts by weight of the initiator based on 100 parts by weight of the total of the acrylic acid ester-based monomer (a) and the polyfunctional monomer (b) in polymerization of the acryl-based rubbery polymer (A).

The graft copolymer (I) to be used in the present invention is obtained by graft-polymerizing the monomer mixture (B) containing an aromatic vinyl-based monomer and a vinyl cyanide-based monomer in the presence of the acryl-based rubbery polymer (A). In other words, the graft copolymer (I) is obtained by graft-copolymerizing the monomer mixture (B), which contains an aromatic vinyl-based monomer and a vinyl cyanide-based monomer, with the acryl-based rubbery polymer (A).

The blending amount of the acryl-based rubbery polymer (A) is preferably 20 parts by weight or more, more preferably 30 parts by weight or more based on 100 parts by weight of the total of the acryl-based rubbery polymer (A) and the monomer mixture (B) that form the graft copolymer (I). On the other hand, the blending amount of the acryl-based rubbery polymer (A) is preferably 70 parts by weight or less, more preferably 60 parts by weight or less. The blending amount of the monomer mixture (B) is preferably 30 parts by weight or more, more preferably 40 parts by weight or more. On the other hand, the blending amount of the monomer mixture (B) is preferably 80 parts by weight or less, more preferably 70 parts by weight or less.

The monomer mixture (B) that forms the graft copolymer (I) contains an aromatic vinyl-based monomer and a vinyl cyanide-based monomer, and may further contain a monomer copolymerizable therewith as necessary.

Examples of the aromatic vinyl-based monomer include styrene, α-methylstyrene, p-methylstyrene, m-methylstyrene, o-methylstyrene and t-butylstyrene. Two or more thereof may be used. Among them, styrene is preferred.

Examples of the vinyl cyanide-based monomer include acrylonitrile, methacrylonitrile and ethacrylonitrile. Two or more thereof may be used. Among them, acrylonitrile is preferred.

Other copolymerizable monomers are not particularly limited as long as the effect of the present invention is not impaired, and examples thereof include unsaturated carboxylic acid alkyl ester-based monomers, unsaturated fatty acids, acrylamide-based monomers and maleimide-based monomers. Two or more thereof may be used.

Examples of the unsaturated carboxylic acid alkyl ester-based monomer include methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate and chloromethyl (meth)acrylate. Two or more thereof may be used.

Examples of the unsaturated fatty acid include itaconic acid, maleic acid, fumaric acid, butenoic acid, acrylic acid and methacrylic acid. Two or more thereof may be used.

Examples of the acrylamide-based monomer include acrylamide, methacrylamide and N-methylacrylamide. Two or more thereof may be used.

Examples of the maleimide-based monomer include N-methylmaleimide, N-isopropylmaleimide, N-butylmaleimide, N-hexylmaleimide, N-octylmaleimide, N-dodecylmaleimide, N-cyclohexylmaleimide and N-phenylmaleimide. Two or more thereof may be used.

For the mixing ratio in the monomer mixture (B), it is preferred that the ratio of the aromatic vinyl-based monomer is 60 to 80% by weight, the ratio of the vinyl cyanide-based monomer is 20 to 40% by weight, the ratio of other copolymerizable monomers is 0 to 20% by weight in 100% by weight of the total of the monomer mixture (B).

The graft ratio (β) of the graft copolymer (I) is preferably 5 to 40%. The graft ratio (β) is an index expressing the compatibility of the graft copolymer (I), and when the graft ratio is 5% or more, the compatibility of the graft copolymer (I) in the thermoplastic resin composition is improved, so that the impact resistance of the molded article can be further improved. The graft ratio (β) of the graft copolymer (I) is more preferably 8% or more. On the other hand, when the graft ratio is 40% or less, particles of the graft copolymer (I) are easily aggregated in the thermoplastic resin composition, so that the impact resistance of the molded article can be further improved. The graft ratio (β) of the graft copolymer (I) is more preferably 35% or less, further preferably 30% or less.

The graft ratio (β) of the graft copolymer (I) can be determined by the following method. First, 100 ml of acetonitrile is added a predetermined amount (m; about 1.5 g) of the graft copolymer (I) that had been vacuum-dried at 80° C. for 3 hours, and the mixture was circulated in a hot water bath at 70° C. for 3 hours. This solution is centrifugally separated at 9000 rpm for 40 minutes, an insoluble matter is then filtered, the insoluble matter is vacuum-dried at 80° C. for 5 hours, and the weight (n) is measured. The graft ratio (β) is calculated by the following equation. Here, L is a rubber content (% by weight) of a graft copolymer (i.e. content (% by weight) of acryl-based rubbery polymer (A) in graft copolymer).

Graft ratio (%)={[(n)−((m)×L/100)]/[(m)×L/100]}×100

Using, for example, the acryl-based rubbery polymer (A), the graft ratio of the graft copolymer (I) can be adjusted to be in a desired range by, for example, the amounts of a chain transfer agent, an emulsifier and an initiator which are used for polymerization.

In the present invention, the ratio of the gel swelling degree (α) [times] of the acryl-based rubbery polymer (A) in toluene to the graft ratio (β) [%] of the graft copolymer (I) ((α)/(β)) is in the range of 0.4≤(α)/(β)≤2.0. The ratio (α)/(β) is an index expressing ease with which the graft copolymer (I) is aggregated, and when the ratio (α)/(β) is less than 0.4, particles of the graft polymer (I) are hard to be aggregated in the thermoplastic resin composition, so that the impact resistance of the molded article is reduced. The ratio (α)/(β) is preferably 0.5 or more, more preferably 0.7 or more. On the other hand, when the ratio (α)/(β) is more than 2.0, the compatibility of the graft copolymer (I) in the thermoplastic resin composition is reduced, so that the dispersibility of the graft copolymer (I) in the thermoplastic resin composition is deteriorated, and therefore the impact resistance of the molded article is reduced. The ratio (α)/(β) is preferably 1.7 or less. The ratio (α)/(β) is determined from a gel swelling degree (α) rounded to one decimal place and a graft ratio (β) rounded to the nearest integer, where a value obtained by dividing the gel swelling degree (α) by the graft ratio (β) is rounded to one decimal place. The ratio (α)/(β) can be adjusted to be in a desired range by, for example, the amounts of a polyfunctional monomer, water, a chain transfer agent, an emulsifier and an initiator which are used for polymerization.

As a method for polymerizing the graft copolymer (I), any method such as an emulsion polymerization method, a suspension polymerization method, a continuous bulk polymerization method or a solution continuous polymerization method can be used, and two or more of these methods may be combined. Among them, an emulsion polymerization or a bulky polymerization method is preferred. An emulsion polymerization method is most preferred because the temperature is easily controlled during polymerization.

Examples of the emulsifier to be used in the method for emulsion polymerization of the graft copolymer (I) may include those shown as examples of the emulsifier to be used in the method for emulsion polymerization of the acryl-based rubbery polymer (A). Examples of the polymerization initiator to be used for polymerization of the graft copolymer (I) may include those shown as examples of the initiator to be used for polymerization of the acryl-based rubbery polymer (A).

A chain transfer agent can also be used for the purpose of adjusting the polymerization degree and graft ratio of the graft copolymer (I). Specific examples of the chain transfer agent include mercaptans such as n-octylmercaptan, t-dodecylmercaptan, n-dodecylmercaptan, n-tetradecylmercaptan and n-octadecylmercaptan, and terpenes such as terpinolene. Two or more thereof may be used. Among them, n-octylmercaptan and t-dodecylmercaptan are preferably used.

For adjusting the graft ratio of the graft copolymer (I) to be in the preferred range, it is preferred to use 0.05 to 0.5 parts by weight of the chain transfer agent, 0.5 to 5 parts by weight of the emulsifier and 0.1 to 0.5 parts by weight of the initiator based on 100 parts by weight of the total of the acryl-based rubbery polymer (A) and the monomer mixture (B) in polymerization of the graft copolymer (I).

The graft copolymer (I) can be recovered by adding a coagulant to a graft copolymer (I) latex produced by emulsion polymerization. As the coagulant, an acid or a water soluble salt is used. Specific examples of the coagulant include acids such as sulfuric acid, hydrochloric acid, phosphoric acid and acetic acid, and water-soluble salts such as calcium chloride, magnesium chloride, barium chloride, aluminum chloride, magnesium sulfate, aluminum sulfate, aluminum ammonium sulfate, ammonium potassium sulfate and aluminum sodium sulfate. Two or more thereof may be used. When the graft copolymer (I) is coagulated with an acid, a method can also be used in which the acid is neutralized with an alkali, and the graft copolymer (I) is then recovered.

The monomer mixture (B) containing an aromatic vinyl-based monomer and a vinyl cyanide-based monomer is graft-copolymerized with the acryl-based rubbery polymer (A) by the above-mentioned method, but all the monomer mixture (B) containing a vinyl cyanide-based monomer may not be graft-copolymerized with the acryl-based rubbery polymer (A). Therefore, the graft copolymer (I) in the present invention may include a copolymer composed of the monomer mixture (B) containing an aromatic vinyl-based monomer and a vinyl cyanide-based monomer, which is not graft-copolymerized with the acryl-based rubbery polymer (A).

The vinyl-based copolymer (II) to be used in the present invention is obtained by copolymerizing at least an aromatic vinyl-based monomer and a vinyl cyanide-based monomer. A monomer copolymerizable with these monomers may be further copolymerized as necessary.

Specific examples of the aromatic vinyl-based monomer include styrene, α-methylstyrene, p-methylstyrene, m-methylstyrene, o-methylstyrene and t-butylstyrene. Two or more thereof may be used. Among them, styrene is preferred.

The content of the aromatic vinyl-based monomer in 100% by weight of the total of monomers that form the vinyl-based copolymer (II) is preferably 60 to 80% by weight. When the content of the aromatic vinyl-based monomer is 60% by weight or more, the fluidity of the thermoplastic resin composition can be further improved. When the content of the aromatic vinyl-based monomer is 80% by weight or less, the impact resistance of the molded article can be further improved.

Specific examples of the vinyl cyanide-based monomer include acrylonitrile, methacrylonitrile and ethacrylonitrile. Two or more thereof may be used. Among them, acrylonitrile is preferred.

The content of the vinyl cyanide-based monomer in 100% by weight of the total of monomers that form the vinyl-based copolymer (II) is preferably 20 to 40% by weight. When the content of the vinyl cyanide-based monomer is 20% by weight or more, the impact resistance of the molded article can be further improved. On the other hand, when the content of the vinyl cyanide-based monomer is 40% by weight or less, the fluidity and color tone of the thermoplastic resin composition can be further improved.

Other copolymerizable monomers are not particularly limited as long as the effect of the present invention is not impaired, and specific examples thereof include unsaturated carboxylic acid alkyl ester-based monomers, unsaturated fatty acids, acrylamide-based monomers and maleimide-based monomers. Two or more thereof may be used. Specific examples of other monomers may include those shown as examples of other monomers that form the monomer mixture (B) to be used in the graft copolymer (I).

The content of other copolymerizable monomers in 100% by weight of the total of monomers that form the vinyl-based copolymer (II) is preferably 0 to 20% by weight. When the content of other copolymerizable monomers is 20% by weight or less, the balance between the fluidity of the thermoplastic resin composition and the impact resistance of the molded article can be further improved.

As a method for polymerizing the vinyl-based copolymer (II), any method such as a suspension polymerization method, an emulsion polymerization method or a continuous bulk polymerization method can be used, and two or more of these methods may be combined. Among them, suspension polymerization is most preferred in view of ease of controlling polymerization and ease of post treatment.

Examples of the suspension stabilizer to be used in suspension polymerization include inorganic suspension stabilizers such as barium sulfate and magnesium hydroxide, and organic suspension stabilizers such as polyvinyl alcohol, carboxymethyl cellulose, hydroxyethyl cellulose, polyacrylamide and methyl methacrylate/acrylamide copolymers. Two or more thereof may be used. Among them, organic suspension stabilizers are preferred from the viewpoint of color tone stability.

Examples of the initiator to be used for suspension polymerization of the vinyl-based copolymer (II) may include those shown as examples of the initiator for the graft copolymer (I). Chain transfer agents such as mercaptan and terpene shown as examples of the chain transfer agent to be used in the graft copolymer (I) can also be used for the purpose of adjusting the polymerization degree of the vinyl-based copolymer (II). In suspension polymerization, a slurry of the vinyl-based copolymer (II) is obtained, and the bead-shaped vinyl-based copolymer (II) is obtained through dehydration and drying.

A thermoplastic resin composition of the present invention includes 30 to 70 parts by weight of a graft copolymer (I) and 30 to 70 parts by weight of a vinyl-based copolymer (II) based on 100 parts by weight of the total of the graft copolymer (I) and the vinyl-based copolymer (II). When the blending amount of the graft copolymer (I) is less than 30 parts by weight, and the blending amount of the vinyl-based copolymer (II) is more than 70 parts by weight, the impact resistance of the molded article is reduced. For adjusting the number average particle size of aggregated particles to be in the later-described preferred range, and further improving the impact resistance of the molded article, it is preferred that the thermoplastic resin composition includes 40 parts by weight or more of the graft copolymer (I) and 60 parts by weight or less of the vinyl-based copolymer (II), and it is more preferred that the thermoplastic resin composition includes 45 parts by weight or more of the graft copolymer (I) and 55 parts by weight or less of the vinyl-based copolymer (II). When the blending amount of the graft copolymer (I) is more than 70 parts by weight, and the blending amount of the vinyl-based copolymer (II) is less than 30 parts by weight, the fluidity and moldability of the thermoplastic resin composition are deteriorated. It is preferred that the thermoplastic resin composition includes 60 parts by weight or less of the graft copolymer (I), and 40 parts by weight of more of the vinyl-based copolymer (II).

The thermoplastic resin composition of the present invention has a structure in which particles of the graft copolymer (I) are aggregated in the thermoplastic resin composition. When particles of the graft copolymer (I) are aggregated to form a pseudo-large particles, the impact resistance of the molded article can be considerably improved.

The number average particle size of the aggregated particles is preferably 0.25 to 0.75 µm. When the number average particle size is 0.25 µm or more, the aggregation effect is improved, so that the impact resistance of the molded article can be further improved. The number average particle size is more preferably 0.30 µm or more. On the other hand, when the number average particle size is 0.75 µm or less, the dispersibility of the graft copolymer (I) in thermoplastic resin composition is improved, so that the impact resistance of the molded article can be further improved. The number average particle size is more preferably 0.7 µm or less, still more preferably 0.5 µm or less, further preferably 0.45 µm or less.

The number average particle size of aggregated particles of the graft copolymer (I) in the thermoplastic resin composition can be adjusted to be in the above-mentioned range by, for example, adjusting each of the volume average particle size of the acryl-based rubbery polymer (A), the gel swelling degree ($\alpha$) of the acryl-based rubbery polymer (A) in toluene, and the graft ratio ($\beta$) of the graft copolymer (I) to be in the above-mentioned preferred range.

In the present invention, the aggregated state of the graft copolymer (I) in the thermoplastic resin composition can be observed by the following method. When general molding conditions are employed, the aggregated state of the graft copolymer (I) and the number average particle size of aggregated particles in the thermoplastic resin composition are maintained in the molded article, and therefore in the present invention, the aggregated state in the molded article can be observed. Specifically, a narrow part of a multipurpose test piece type A (total length: 150 mm; wide and thickness of test part: 10 mm and 4 mm, respectively) obtained by molding the thermoplastic resin composition in an injection molding machine and defined in ISO 3167: 2002 is thinly cut to a thickness of about 60 nm, and stained with ruthenium tetroxide. The sample thus obtained can be observed with a transmission electron microscope (magnification: 20,000). Here, the acryl-based rubbery polymer (A) is stained, and therefore particles of the graft copolymer (I)

obtained from the acryl-based rubbery polymer (A) can be observed. The number average particle size of the aggregated particles can be determined by measuring the maximum sizes of 50 aggregated particles randomly selected in a photograph taken at a magnification of 20,000 in a transmission electron microscope, and calculating the number average value thereof.

As an example of a thermoplastic resin composition having a structure in which particles of the graft copolymer (I) are aggregated, a transmission electron microscope photograph of a thermoplastic resin composition obtained in Example 101 as described later is shown in FIG. 1. In FIG. 1, symbol 1 denotes a graft copolymer primary particle, and a plurality of graft copolymer primary particles 1 are aggregated to form a graft copolymer aggregated particle 2. The light-color part denoted by symbol 3 shows a vinyl-based copolymer. In the case of a thermoplastic resin composition which does not have a structure in which particles of the graft copolymer (I) are aggregated, graft copolymer primary particles 1 exist in the vinyl-based copolymer 3 while maintaining the form of primary particles without being aggregated as shown in FIG. 2.

The thermoplastic resin composition of the present invention may further contain a flame retardant (III) in addition to the graft copolymer (I) and the vinyl-based copolymer (II).

In the present invention, it is especially preferred that the thermoplastic resin composition includes 30 to 70 parts by weight of the graft copolymer (I), 30 to 70 parts by weight of the vinyl-based copolymer (II) and 1 part by weight or more of the flame retardant (III) based on 100 parts by weight of the total of the graft copolymer (I) and the vinyl-based copolymer (II). When the thermoplastic resin composition includes the flame retardant (III), flame retardancy can be imparted to the molded article.

Examples of the flame retardant (III) to be used in the present invention include organic halogen compounds, phosphorus-based compounds, silicone-based compounds and metal hydroxides. The thermoplastic resin composition may include two or more these compounds. Among them, organic halogen compounds are preferred for further improving flame retardancy.

The organic halogen compound is an organic compound having a carbon-halogen covalent bond, and examples thereof include organic chlorine compounds and organic bromine compounds. Among them, organic bromine compounds are preferred from the viewpoint of heat stability. Examples of the organic bromine compound include brominated epoxy resins, brominated phenoxy resins, brominated polycarbonate resins, brominated polystyrene resins, brominated polyphenylene oxides, decabromodiphenyl oxide bisphenol condensates, tetrabromobisphenol A, oligomers thereof, and brominated triazine compounds. Two or more thereof may be used in combination. Among them, brominated epoxy resins, tetrabromobisphenol A, oligomers thereof, and brominated triazine compounds are preferred for further improving flame retardancy. Moreover, for further improving weather resistance, brominated epoxy resins and oligomers thereof are more preferred, and brominated epoxy resins having an epoxy group at each of both ends, and oligomers thereof are further preferred.

In the thermoplastic resin composition, of the present invention, the blending amount of the flame retardant (III) is preferably 1 part by weight or more based on 100 parts by weight of the total of the graft copolymer (I) and the vinyl-based copolymer (II). When the blending amount of the flame retardant (III) is 1 part by weight or more, the flame retardancy of the molded article is improved. The blending amount of the flame retardant (III) is preferably 5 parts by weight or more, more preferably 8 parts by weight or more. On the other hand, for further improving the impact resistance of the molded article, the blending amount of the flame retardant (III) is preferably 50 parts by weight or less, more preferably 45 parts by weight or less, further preferably 42 parts by weight or less.

The thermoplastic resin composition of the present invention may further include a flame-retardant auxiliary (IV), so that flame retardancy can be further improved. Examples of the flame-retardant auxiliary (IV) include antimony compounds such as antimony trioxide, antimony pentoxide, sodium antimonate and antimony phosphate. Among them, antimony trioxide is preferred. The flame-retardant auxiliary (IV) may be subjected to a surface treatment.

The blending amount of the flame-retardant auxiliary (IV) is preferably 1 to 20 parts by weight based on 100 parts by weight of the total of the graft copolymer (I) and the vinyl-based copolymer (II). When the blending amount of the flame-retardant auxiliary (IV) is 1 part by weight or more, flame retardancy can be further improved. The blending amount of the flame-retardant auxiliary (IV) is more preferably 3 parts by weight or more. On the other hand, when the blending amount of the flame-retardant auxiliary (IV) is 20 parts by weight or less, the impact resistance of the molded article can be further improved. The blending amount of the flame-retardant auxiliary (IV) is more preferably 15 parts by weight or less.

The thermoplastic resin composition of the present invention may further contain a heat-resistant vinyl-based copolymer (V) obtained by copolymerizing an aromatic vinyl-based monomer, a vinyl cyanide-based monomer and a maleimide-based monomer, and/or a polycarbonate resin (VI), so that heat resistance can be improved. It is more preferred that the thermoplastic resin composition contains the polycarbonate resin (VI), so that further, surface impact resistance can be improved.

Examples of the aromatic vinyl-based monomer that forms the heat-resistant vinyl-based copolymer may include those shown as examples of the aromatic vinyl-based monomer to be used in the graft copolymer (I), and styrene is preferably used. Examples of the vinyl cyanide-based monomer that forms the heat-resistant vinyl-based copolymer may include those shown as examples of the vinyl cyanide-based monomer to be used in the graft copolymer (I), and acrylonitrile is preferably used. Examples of the heat-resistant vinyl-based monomer that forms the heat-resistant vinyl-based copolymer may include those shown as examples of the maleimide-based monomer to be optionally used in the graft copolymer (I), and N-phenylmaleimide is preferably used.

For composition ratio of monomers that form the heat-resistant vinyl-based copolymer, it is preferred that the ratio of the aromatic vinyl-based monomer is 36 to 65% by weight, the ratio of the vinyl cyanide-based monomer is 0 to 12% by weight, and the ratio of the maleimide-based monomer is 35 to 52% by weight in 100% by weight of the total of the aromatic vinyl-based monomer, the vinyl cyanide-based monomer and the maleimide-based monomer.

In the thermoplastic resin composition of the present invention, the blending amount of the heat-resistant vinyl-based copolymer is preferably 1 part by weight or more, more preferably 2 parts by weight or more, further preferably 5 parts by weight or more based on 100 parts by weight of the total of the graft copolymer (I) and the vinyl-based copolymer (II). On the other hand, the blending amount of the heat-resistant vinyl-based copolymer is preferably 100 parts by weight or less, more preferably 90 parts by weight or less, further preferably 85 parts by weight or less.

The polycarbonate resin to be used in the present invention is a thermoplastic resin obtained by reacting a di-or-more-valent phenolic compound with phosgene or a carbonic acid diester compound such as diphenyl carbonate. As the polycarbonate resin, for example, a polycarbonate resin obtained by an interfacial polycondensation method including reacting bisphenol A with phosgene, or a polycarbonate resin obtained by a melt polymerization method including reacting bisphenol A with diphenyl carbonate is preferred.

In the thermoplastic resin composition of the present invention, the blending amount of the polycarbonate resin is preferably 10 parts by weight or more based on 100 parts by weight of the total of the graft copolymer (I) and the vinyl-based copolymer (II). When the blending amount of the polycarbonate resin is 10 parts by weight or more, heat resistance and surface impact resistance are improved. The blending amount of the polycarbonate resin is preferably 40 parts by weight or more, more preferably 50 parts by weight or more. On the other hand, the blending amount of the polycarbonate resin is preferably 400 parts by weight or less from the viewpoint of fluidity and moldability.

The thermoplastic resin composition of the present invention may also include additives in such a range that does not adversely affect the effect of the present invention, and examples thereof include various kind of stabilizers such as antioxidants such as hindered phenol-based, sulfur-containing organic compound-based and phosphorus-containing organic compound-based antioxidants; heat stabilizers such as phenol-based and acrylate-based heat stabilizers; ultraviolet absorbers such as benzotriazole-based, benzophenone-based and salicylate-based ultraviolet absorbers; light stabilizers such as organic nickel-based and hindered amine-based light stabilizers; lubricants such as metal salts of higher fatty acids and higher fatty acid amides; plasticizers such as phthalic acid esters and phosphoric acid esters; drip preventing agents such as polytetrafluoroethylene; antistatic agents; carbon black, titanium oxide, pigments and dyes; and liquids such as water, silicone oil and liquid paraffin. The thermoplastic resin composition may also include a filler.

Examples of the filler include fibrous, tabular, powdered and granular fillers, and any of these fillers may be used in the present invention. Specific examples thereof include fibrous or whisker-like fillers such as polyacrylonitrile (PAN)-based and pitch-based carbon fibers, metal fibers such as stainless fibers, aluminum fibers and brass fibers, organic fibers such as aromatic polyamide fibers, gypsum fibers, ceramic fibers, asbestos fibers, zirconia fibers, alumina fibers, silica fibers, titanium oxide fibers, silicon carbide fibers, glass fibers, rock wools, potassium titanate whiskers, barium titanate whiskers, aluminum borate whiskers and silicon nitride whiskers; powdered, granular or tabular fillers such as mica, talc, kaolin, silica, calcium carbonate, glass flakes, glass beads, glass microballoons, clays, molybdenum disulfide, wollastonite, montmorillonite, titanium oxide, zinc oxide, barium sulfate, potassium polyphosphate and graphite. Two or more thereof may be used. Among them, glass fibers are preferably used. The type of glass fibers is not particularly limited as long as they are generally used for reinforcing a resin, and examples thereof may include long fiber type and short fiber type chopped strands and milled fibers. The surface of the filler may be treated with any coupling agent (e.g. silane coupling agent or titanate-based coupling agent), or other surface treatment agents. The surface of the filler may be coated or sized with a thermoplastic resin such as an ethylene/vinyl acetate copolymer, or a thermosetting resin such as an epoxy resin, or may be treated with a coupling agent such as aminosilane or epoxysilane.

The blending amount of filler is preferably 0.01 to 100 parts by weight based on 100 parts by weight of the total of the graft copolymer (I) and the vinyl-based copolymer (II). When the blending amount of the filler is in the above-mentioned range, the rigidity and heat resistance of the molded article are improved. The blending amount of the filler is more preferably 0.05 parts by weight or more, further preferably 0.1 part by weight or more. On the other hand, the blending amount of the filler is more preferably 50 parts by weight or less, further preferably 30 parts by weight or less.

While the method for producing a thermoplastic resin composition is not particularly limited, a method including melting and kneading the graft copolymer (I), the vinyl-based copolymer (II) and other components as necessary is general from the viewpoint of productivity. When the additives etc. are blended, the method for blending the additives etc. is not particularly limited, and various methods may be used.

The thermoplastic resin composition of the present invention can be molded by a known method such as injection molding, extrusion molding, blow molding, vacuum molding, compression molding or gas-assisted molding. The thermoplastic resin composition is molded preferably by injection molding although the molding method is not particularly limited. Injection molding can be carried out at a temperature preferably in the range of 210 to 260° C. The mold temperature during injection molding is preferably 30 to 80° C.

EXAMPLES

The present invention will now be described in detail by way of examples, but the present invention is not limited thereto. First, methods for evaluation of properties in reference examples, examples and comparative examples will be described.

(1) Measurement of Volume Average Particle Size of Acryl-Based Rubbery Polymer

A rubbery polymer latex obtained in each of reference examples was diluted and dispersed with an aqueous medium, and the volume average particle size was measured using a laser scattering/diffraction particle size distribution measuring apparatus "LS 13 320" (Beckman Coulter, Inc.).

(2) Measurement of Gel Swelling Degree and Gel Content of Acryl-Based Rubbery Polymer The rubbery polymer latex obtained in each of reference examples, and then sulfuric acid were added in methanol, and the mixture was dehydrated and washed to obtain a rubbery polymer solid. The resulting rubbery polymer solid was vacuum-dried at 80° C. for 3 hours, a predetermined amount (x [g]) of the solid was then immersed in toluene for 24 hours, and the weight (y [g]) of the swollen sample was measured. The swollen sample was vacuum-dried at 80° C. for 3 hours, and the weight (z [g]) of the dried sample was then measured. The gel content and the gel swelling degree were calculated by the following equation.

$$\text{Gel swelling degree(times)}=(y)/(z).$$

$$\text{Gel content (\%)}=([z]/[x])\times 100.$$

(3) Measurement of Graft Ratio of Graft Copolymer

The graft copolymer obtained in each of reference examples was vacuum-dried at 80° C. for 3 hours, and a predetermined amount (m; about 1.5 g) of the graft copolymer was taken. To this was added 100 ml of acetonitrile, the mixture was refluxed in a hot water bath at 70° C. for 3 hours, the resulting solution was centrifugally separated at 9000 rpm for 40 minutes, and an insoluble matter was then filtered. The insoluble matter was vacuum-dried at 80° C. for 5 hours, and the weight (n [g]) was measured. The graft ratio was calculated by the following equation. Here, L is a rubber content (% by weight) of a graft copolymer (i.e. content (% by weight) of acryl-based rubbery polymer in graft copolymer).

$$\text{Graft ratio (\%)} = \{[(n)-((m) \times L/100)]/[(m) \times L/100]\} \times 100$$

(4) Evaluation of Impact Resistance: Charpy Impact Strength

The Charpy impact strength was measured in accordance with ISO 179-1: 2010 using a multipurpose test piece type A (total length: 150 mm; wide and thickness of test part: 10 mm and 4 mm, respectively) obtained in each of examples and comparative examples and defined in ISO 3167: 2002. The Charpy impact strength was measured for eight test pieces, and the number average value thereof was calculated.

(5) Evaluation of Fluidity Melt Flow Rate (MFR)

A pellet obtained in each of examples and comparative examples was dried in a hot-air dryer at 80° C. for 3 hours, and the melt flow rate was then measured using a method conforming to ISO 1133-1: 2011 (220° C., 98 N).

(6) Evaluation of Weather Resistance

A 3 mm-thick tetragonal plate test piece obtained in each of examples and comparative examples was irradiated under the condition of a temperature of 63° C. and a cycle of 60 minutes (rain fall: 12 minutes) for 1000 hours using Sunshine Weather Meter (manufactured by Suga Test Instruments Co., Ltd.), and a color difference (ΔE) before and after irradiation was measured.

(7) Evaluation of Flame Retardancy

For a 1.5 mm-thick long test piece (burning test piece) obtained in each of examples and comparative examples, flame retardancy was evaluated in accordance with the evaluation criteria defined in UL 94. The burning test piece was held vertical, a blue flame having a length of 20 mm was brought into contact with the center of the lower end of the burning test piece, and kept in this state for 10 seconds, the flame was then taken away from the test piece, and the burning time was measured. Thereafter, the first flame was allowed to disappear, and the burning test piece was brought into contact with a flame again, and kept in this state for 10 seconds, followed by measuring the burning time and the glow extinction time. The measurement was performed for five burning test pieces (n=5). Evaluations were made based on the following criteria.

[V-0]:

The burning test piece does not burn for 10 seconds or more after the first flame contact and after the second flame contact, and the glow extinction time after the second flame contact is 30 seconds or less. The gauze placed 30 cm below the burning test piece must not catch fire. Further, the total flaming burning time of the five burning test pieces is 50 seconds or less.

[V-2]:

The burning test piece does not burn for 30 seconds or more after the first flame contact and after the second flame contact, and the glow extinction time after the second flame contact is 60 seconds or less. The gauze placed 30 cm below the burning test piece may catch fire. Further, the total flaming burning time of the five burning test pieces is 250 seconds or less.

[NG (very poor)]: The burning test piece burns for 30 seconds or more after the first flame contact and after the second flame contact, or the glow extinction time after the second flame contact is 60 seconds or more. The total flaming burning time of the five burning test pieces is more than 250 seconds. In this case, the burning test pieces are rated NG.

(8) Observation of Aggregated State of Graft Copolymer and Measurement of Number Average Particle Size of Aggregated Particles in Thermoplastic Resin Composition A narrow part of a multipurpose test piece type A (total length: 150 mm; wide and thickness of test part: 10 mm and 4 mm, respectively) obtained in each of examples and comparative examples and defined in ISO 3167: 2002 was thinly cut to a thickness of about 60 nm, and stained with ruthenium tetroxide. The sample thus obtained was observed with a transmission electron microscope (magnification: 20,000; observation range: 5 μm×5 μm), and the aggregated state of the graft copolymer was discriminated as follows.

y: Graft copolymer particles are aggregated.

n: Graft copolymer particles are not aggregated.

For samples in which graft copolymer particles were aggregated, 50 aggregated particles were randomly selected in a photograph of the thermoplastic resin taken in a transmission electron microscope (magnification: 20,000; observation range: 5 μm×5 μm), the maximum sizes of the aggregated particles were measured, and the number average value thereof was calculated.

Reference Example 1

In a reaction vessel were added 130 parts by weight of pure water, and 1 part by weight (in terms of a solid content) of an aqueous disproportionated potassium rosinate solution as an emulsifier, the temperature was elevated to 75° C., and a mixture of 19.8 parts by weight of n-butyl acrylate and 0.2 parts by weight of allyl methacrylate was continuously added under stirring for 1 hour. Then, 10 parts by weight of a 2 wt % aqueous potassium persulfate solution, and 1.5 parts by weight (in terms of a solid content) of an aqueous disproportionated potassium rosinate solution were each continuously added for 6 hours. Two hours after the start of adding the aqueous potassium persulfate solution and the aqueous disproportionated potassium rosinate solution, a mixture of 79.2 parts by weight of n-butyl acrylate and 0.8 parts by weight of allyl methacrylate was added for 4 hours, and thereafter the mixture was held for further 1 hour to obtain acryl-based rubbery polymer (A-1) latex with a polymerization rate of 95%.

A mixture of 13.2 parts by weight of pure water, 0.48 parts by weight of anhydrous glucose, 0.26 parts by weight of sodium pyrophosphate and 0.01 part by weight of ferrous sulfate, a mixture of 0.4 parts by weight of potassium oleate and 12.5 parts by weight of pure water, 50 parts by weight (in terms of a solid content) of the acryl-based rubbery polymer (A-1) and 94.3 parts by weight of pure water were added in a reaction vessel, the temperature was elevated to 58° C., and a mixture (i) of 36.5 parts by weight of styrene, 13.5 parts by weight of acrylonitrile and 0.2 parts by weight of t-dodecylmercaptan was continuously added for 4 hours. A half-hour after the start of continuously adding the mixture (i), the temperature in the vessel was elevated to 62° C., and a mixture of 0.3 parts by weight of cumene hydroperoxide, 2.0 parts by weight of potassium oleate and 12.5 parts by weight of pure water was continuously added in parallel for 5 hours. Subsequently, after addition of the mixture (i) was completed, the temperature was further elevated to 65° C. to obtain a graft copolymer (I-1) latex with a polymerization rate of 98%. Hundred parts by weight (in terms of a solid content) of the obtained latex was poured with stirring into 900 parts by weight of water at 85° C., which contained 3 parts by weight of magnesium sulfate, so that the latex was solidified, and dehydration and drying were performed to obtain a powdered graft copolymer (I-1).

Reference Example 2

Except that the total added amount of n-butyl acrylate was 98.8 parts by weight and the total added amount of allyl methacrylate was 1.2 parts by weight based on 100 parts by weight of the total of n-butyl acrylate and allyl methacrylate in connection with Reference Example 1, the same procedure as in Reference Example 1 was carried out to obtain an acryl-based rubbery polymer (A-2) latex. Except that an acryl-based rubbery polymer (A-2) was used in place of the acryl-based rubbery polymer (A-1), the same procedure as in Reference Example 1 was carried out to produce a graft copolymer (I-2).

Reference Example 3

Except that the total added amount of n-butyl acrylate was 98.8 parts by weight, and 1 part by weight of allyl methacrylate and 0.2 parts by weight of diethylene glycol dimethacrylate were added based on 100 parts by weight of the total of n-butyl acrylate, allyl methacrylate and diethylene glycol dimethacrylate in connection with Reference Example 1, the same procedure as in Reference Example 1 was carried out to obtain an acryl-based rubbery polymer (A-3) latex. Except that an acryl-based rubbery polymer (A-3) was used in place of the acryl-based rubbery polymer (A-1), the same procedure as in Reference Example 1 was carried out to produce a graft copolymer (I-3).

Reference Example 4

Except that the total added amount of n-butyl acrylate was 98.5 parts by weight and the total added amount of allyl methacrylate was 1.5 parts by weight based on 100 parts by weight of the total of n-butyl acrylate and allyl methacrylate in connection with Reference Example 1, the same procedure as in Reference Example 1 was carried out to obtain an acryl-based rubbery polymer (A-4) latex. Except that an acryl-based rubbery polymer (A-4) was used in place of the acryl-based rubbery polymer (A-1), the same procedure as in Reference Example 1 was carried out to produce a graft copolymer (I-4).

Reference Example 5

Except that the total added amount of n-butyl acrylate was 97.5 parts by weight and the total added amount of allyl methacrylate was 2.5 parts by weight based on 100 parts by weight of the total of n-butyl acrylate and allyl methacrylate in connection with Reference Example 1, the same procedure as in Reference Example 1 was carried out to obtain an acryl-based rubbery polymer (A-5) latex. Except that an acryl-based rubbery polymer (A-5) was used in place of the acryl-based rubbery polymer (A-1), the same procedure as in Reference Example 1 was carried out to produce a graft copolymer (I-5).

Reference Example 6

Except that the added amount of the 2 wt % aqueous potassium persulfate solution was 8 parts by weight based on 100 parts by weight of the total of n-butyl acrylate and allyl methacrylate in connection with Reference Example 1, the same procedure as in Reference Example 1 was carried out to obtain an acryl-based rubbery polymer (A-6) latex. Except that an acryl-based rubbery polymer (A-6) was used in place of the acryl-based rubbery polymer (A-1), the same procedure as in Reference Example 1 was carried out to produce a graft copolymer (I-6).

Reference Example 7

Except that the total added amount of n-butyl acrylate was 99.6 parts by weight and the total added amount of allyl methacrylate was 0.4 parts by weight based on 100 parts by weight of the total of n-butyl acrylate and allyl methacrylate in connection with Reference Example 1, the same procedure as in Reference Example 1 was carried out to obtain an acryl-based rubbery polymer (A-7) latex. Except that an acryl-based rubbery polymer (A-7) was used in place of the acryl-based rubbery polymer (A-1), the same procedure as in Reference Example 1 was carried out to produce a graft copolymer (I-7).

Reference Example 8

Except that the total added amount of n-butyl acrylate was 96 parts by weight and the total added amount of allyl methacrylate was 4 parts by weight based on 100 parts by weight of the total of n-butyl acrylate and allyl methacrylate in connection with Reference Example 1, the same procedure as in Reference Example 1 was carried out to obtain an acryl-based rubbery polymer (A-8) latex. Except that an acryl-based rubbery polymer (A-8) was used in place of the acryl-based rubbery polymer (A-1), the same procedure as in Reference Example 1 was carried out to produce a graft copolymer (I-8).

Reference Example 9

Except that the total added amount of n-butyl acrylate was 97 parts by weight, and 1.5 parts by weight of allyl methacrylate and 1.5 parts by weight of diethylene glycol dimethacrylate were added based on 100 parts by weight of the total of n-butyl acrylate, allyl methacrylate and diethylene glycol dimethacrylate in connection with Reference Example 1, the same procedure as in Reference Example 1 was carried out to obtain an acryl-based rubbery polymer (A-9) latex. Except that an acryl-based rubbery polymer (A-9) was used in place of the acryl-based rubbery polymer (A-1), the same procedure as in Reference Example 1 was carried out to produce a graft copolymer (I-9).

Reference Example 10

Except that the total added amount of the aqueous disproportionated potassium rosinate solution was 6 parts by weight (in terms of a solid content) based on 100 parts by weight of the total of n-butyl acrylate and allyl methacrylate in connection with Reference Example 1, the same procedure as in Reference Example 1 was carried out to obtain an acryl-based rubbery polymer (A-10) latex. Except that an acryl-based rubbery polymer (A-10) was used in place of the acryl-based rubbery polymer (A-1), the same procedure as in Reference Example 1 was carried out to produce a graft copolymer (I-10).

Reference Example 11

Except that the total added amount of the aqueous disproportionated potassium rosinate solution was 1.25 parts by weight (in terms of a solid content) based on 100 parts by weight of the total of n-butyl acrylate and allyl methacrylate in connection with Reference Example 1, the same procedure as in Reference Example 1 was carried out to obtain an acryl-based rubbery polymer (A-11) latex. Except that an acryl-based rubbery polymer (A-11) was used in place of the acryl-based rubbery polymer (A-1), the same procedure as in Reference Example 1 was carried out to produce a graft copolymer (I-11).

Reference Example 12

Except that the total added amount of n-butyl acrylate was 97 parts by weight and the total added amount of allyl methacrylate was 3 parts by weight based on 100 parts by weight of the total of n-butyl acrylate and allyl methacrylate, the same procedure as in production of the acryl-based rubbery polymer (A) latex in Reference Example 1 was carried out to obtain a latex. 4 parts by weight of an acid group-containing latex (solid content) was added to 100 parts by weight of the obtained latex (solid content), and the mixture was stirred at 50° C. for 1 hour to obtain an acryl-based rubbery polymer (A-12) latex. Here, the acid group-containing latex is a latex including 15 parts by weight of methacrylic acid and 85 parts by weight of n-butyl acrylate.

Subsequently, except that an acryl-based rubbery polymer (A-12) was used in place of the acryl-based rubbery polymer (A-1), the same procedure as in Reference Example 1 was carried out to produce a graft copolymer (I-12).

Reference Example 13

Except that the total added amount of n-butyl acrylate was 99.55 parts by weight and the total added amount of allyl methacrylate was 0.45 parts by weight based on 100 parts by weight of the total of n-butyl acrylate and allyl methacrylate, 5 parts by weight of acrylonitrile was added, and the added amount of the 2 wt % aqueous potassium persulfate solution was 8 parts by weight in connection with Reference Example 1, the same procedure as in Reference Example 1 was carried out to obtain an acryl-based rubbery polymer (A-13) latex. Except that an acryl-based rubbery polymer (A-13) was used in place of the acryl-based rubbery polymer (A-1), the same procedure as in Reference Example 1 was carried out to produce a graft copolymer (I-13).

The compositions, volume average particle sizes, gel swelling degrees ($\alpha$) and gel contents of the acryl-based rubbery polymers, and the compositions and graft ratios ($\beta$) of the graft copolymers, and ratios ($\alpha$)/($\beta$) obtained in Reference Examples 1 to 13 are shown in Table 1.

TABLE 1

| | | | I-1 | I-2 | I-3 | I-4 | I-5 | I-6 | I-7 | I-8 | I-9 | I-10 | I-11 | I-12 | I-13 |
|---|---|---|---|---|---|---|---|---|---|---|---|---|---|---|---|
| Acryl-based rubbery polymer | n-Butyl acrylate | parts by weight | 99 | 98.8 | 98.8 | 98.5 | 97.5 | 99 | 99.6 | 96 | 97 | 99 | 99 | 97 | 99.55 |
| | Allyl methacrylate | parts by weight | 1 | 1.2 | 1 | 1.5 | 2.5 | 1 | 0.4 | 4 | 1.5 | 1 | 1 | 3 | 0.45 |
| | Diethylene glycol dimethacrylate | parts by weight | 0 | 0 | 0.2 | 0 | 0 | 0 | 0 | 0 | 1.5 | 0 | 0 | 0 | 0 |
| | Acrylonitrile | parts by weight | 0 | 0 | 0 | 0 | 0 | 0 | 0 | 0 | 0 | 0 | 0 | 0 | 5 |
| | Acid group-containing latex | parts by weight | 0 | 0 | 0 | 0 | 0 | 0 | 0 | 0 | 0 | 0 | 0 | 4 | 0 |
| | 2 wt % aqueous potassium persulfate solution | parts by weight | 10 | 10 | 10 | 10 | 10 | 8 | 10 | 10 | 10 | 10 | 10 | 10 | 8 |
| | Disproportionated potassium rosinate | parts by weight | 2.5 | 2.5 | 2.5 | 2.5 | 2.5 | 2.5 | 2.5 | 2.5 | 2.5 | 6 | 1.25 | 2.5 | 2.5 |
| | Volume average particle size | µm | 0.19 | 0.18 | 0.18 | 0.19 | 0.17 | 0.16 | 0.18 | 0.20 | 0.24 | 0.09 | 0.35 | 0.39 | 0.14 |
| | Gel swelling degree ($\alpha$) | times | 13.5 | 12.5 | 12.9 | 11.1 | 10 | 15.5 | 19.6 | 7.2 | 8.7 | 10.3 | 7.7 | 8.5 | 17.2 |
| | Gel content | % | 93 | 94 | 94 | 95 | 96 | 89 | 91 | 87 | 92 | 93 | 95 | 92 | 95 |
| Graft copolymer | Number of parts of rubber | parts by weight | 50 | 50 | 50 | 50 | 50 | 50 | 50 | 50 | 50 | 50 | 50 | 50 | 50 |
| | Acrylonitrile | parts by weight | 13.5 | 13.5 | 13.5 | 13.5 | 13.5 | 13.5 | 13.5 | 13.5 | 13.5 | 13.5 | 13.5 | 13.5 | 13.5 |
| | Styrene | parts by weight | 36.5 | 36.5 | 36.5 | 36.5 | 36.5 | 36.5 | 36.5 | 36.5 | 36.5 | 36.5 | 36.5 | 36.5 | 36.5 |
| | Graft Ratio ($\beta$) | % | 10 | 13 | 8 | 18 | 26 | 30 | 1 | 33 | 26 | 7 | 21 | 28 | 9 |
| | ($\alpha$)/($\beta$) | — | | 1.4 | 1.0 | 1.6 | 0.6 | 0.4 | 0.5 | 19.6 | 0.2 | 0.3 | 1.5 | 0.4 | 0.3 | 1.9 |

Reference Example 14

Except that the a rubbery polymer obtained by copolymerizing 69.5 parts by weight of n-butyl acrylate and 0.5 parts by weight of allyl methacrylate in the presence of 30 parts by weight (in terms of a solid content) of a polybutadiene latex was used in place of the acryl-based rubbery polymer (A-1), the same procedure as in Reference Example 1 was carried out to produce a graft copolymer (I-14).

Reference Example 15

Except that 50 parts by weight (in terms of a solid content) of a polybutadiene latex was used in place of the acryl-based rubbery polymer (A-1), the same procedure as in Reference Example 1 was carried out to produce a graft copolymer (I-15).

(Reference Example 16) Vinyl-Based Copolymer (II-1)

In a reaction vessel were added 80 parts by weight of acrylamide, 20 parts by weight of methyl methacrylate, 0.3 parts by weight of potassium persulfate and 1800 parts by weight of pure water, the gas phase in the reaction vessel was purged with a nitrogen gas, and the mixture was kept at 70° C. under stirring. The reaction was continued until the monomers were converted into a polymer, 20 parts by mass of sodium hydroxide and 2000 parts by weight of pure water were then added, and the mixture was stirred at 70° C. for 2 hours, and then cooled to room temperature to obtain a methyl methacrylate-acrylamide binary copolymer aqueous solution serving as a medium for suspension polymerization.

A solution obtained by dissolving 6 parts by weight of the methyl methacrylate-acrylamide binary copolymer aqueous solution in 165 parts by weight of pure water was added in a 20 L autoclave, and stirred at 400 rotations per minute, and the inside of the system was purged with a nitrogen gas. Next, a monomer mixture of 28.9 parts by weight of acrylonitrile, 11.1 parts by weight of styrene, 0.32 parts by weight of azobisisobutyronitrile and 0.32 parts by weight of t-dodecylmercaptan was initially added for 30 minutes while the reaction system was stirred, and a copolymerization reaction was started at 70° C. When one hour elapsed after addition of the monomer mixture, 15 parts by weight of styrene was added using a supply pump. Thereafter, 15 parts by weight of styrene was added to the reaction system three times at intervals of 30 minutes. After addition of all the monomers was completed, the temperature was elevated to 100° C. for 60 minutes. After the temperature reached 100° C., the reaction product was kept at this temperature for 30 minutes, and cooled, and a polymer was separated, washed and dried to obtain a bead-shaped vinyl-based copolymer (II-1).

(Reference Example 17) Vinyl-Based Copolymer (II-2)

Except that the added amount of t-dodecylmercaptan was changed to 0.43 parts by weight in connection with Reference Example 16, the same procedure as in Reference Example 16 was carried out to produce a vinyl-based copolymer (II-2).

Examples 101 to 109 and Comparative Examples 101 to 108

The graft copolymers (I-1 to I-14) prepared in Reference Examples 1 to 14 and the vinyl-based polymers (II-1 and II-2) prepared in Reference Examples 16 and 17 were blended at a blending ratio as shown in Tables 2 and 3, 0.8 parts by weight of amide ethylenebisstearate, 0.3 parts by weight of a light stabilizer ("ADEKA STAB LA-77Y" manufactured by ADEKA CORPORATION) and 0.3 parts by weight of an ultraviolet absorber ("ADEKA STAB LA-32" manufactured by ADEKA CORPORATION) were added, and the mixture was mixed at 23° C. using a Henschel mixer. The obtained mixture melted and kneaded at an extrusion temperature of 230° C. and extruded in the form of a gut by a 40 mmφ extruder, and pelletized. The obtained pellet was injection-molded at a molding temperature of 230° C. and a mold temperature of 60° C. to prepare various kinds of test pieces for evaluation. The results of making evaluations for the test pieces using the above-mentioned methods are shown in Tables 2 and 3. The transmission electron microscope photographs of the thermoplastic resin compositions obtained in Example 101 and Comparative Example 102 are shown in FIGS. 1 and 2, respectively.

TABLE 2

|  |  |  | Example 101 | Example 102 | Example 103 | Example 104 | Example 105 | Example 106 | Example 107 | Example 108 | Example 109 |
|---|---|---|---|---|---|---|---|---|---|---|---|
| Graft copolymer | I-1 | parts by weight | 50 | 50 | 40 | 60 | 0 | 0 | 0 | 0 | 0 |
|  | I-2 | parts by weight | 0 | 0 | 0 | 0 | 50 | 0 | 0 | 0 | 0 |
|  | I-3 | parts by weight | 0 | 0 | 0 | 0 | 0 | 50 | 0 | 0 | 0 |
|  | I-4 | parts by weight | 0 | 0 | 0 | 0 | 0 | 0 | 50 | 0 | 0 |
|  | I-5 | parts by weight | 0 | 0 | 0 | 0 | 0 | 0 | 0 | 50 | 0 |
|  | I-6 | parts by weight | 0 | 0 | 0 | 0 | 0 | 0 | 0 | 0 | 50 |
|  | I-7 | parts by weight | 0 | 0 | 0 | 0 | 0 | 0 | 0 | 0 | 0 |
|  | I-8 | parts by weight | 0 | 0 | 0 | 0 | 0 | 0 | 0 | 0 | 0 |
|  | I-9 | parts by weight | 0 | 0 | 0 | 0 | 0 | 0 | 0 | 0 | 0 |
|  | I-10 | parts by weight | 0 | 0 | 0 | 0 | 0 | 0 | 0 | 0 | 0 |
|  | I-11 | parts by weight | 0 | 0 | 0 | 0 | 0 | 0 | 0 | 0 | 0 |
|  | I-12 | parts by weight | 0 | 0 | 0 | 0 | 0 | 0 | 0 | 0 | 0 |
|  | I-13 | parts by weight | 0 | 0 | 0 | 0 | 0 | 0 | 0 | 0 | 0 |
|  | I-14 | parts by weight | 0 | 0 | 0 | 0 | 0 | 0 | 0 | 0 | 0 |
| Vinyl-based copolymer | II-1 | parts by weight | 50 | 25 | 60 | 40 | 50 | 50 | 50 | 50 | 50 |
|  | II-2 | parts by weight | 0 | 25 | 0 | 0 | 0 | 0 | 0 | 0 | 0 |
| Impact resistance (Charpy Impact Strength) |  | kJ/m$^2$ | 20 | 17 | 12 | 32 | 18 | 19 | 15 | 12 | 18 |
| Fluidity (MFR) |  | g/10 min | 21 | 28 | 30 | 15 | 18 | 22 | 17 | 16 | 16 |
| Weather resistance (ΔE) |  | — | 2.2 | 2.3 | 2.8 | 2.0 | 2.4 | 2.3 | 2.5 | 2.7 | 2.4 |
| Flame retardancy (thickness: 1.5 mm) |  | — | NG | NG | NG | NG | NG | NG | NG | NG | NG |
| Aggregated state |  | — | y | y | y | y | y | y | y | y | y |
| Average aggregated particle size |  | μm | 0.33 | 0.32 | 0.28 | 0.38 | 0.34 | 0.36 | 0.39 | 0.32 | 0.69 |

TABLE 3

|  |  |  | Comparative Example 101 | Comparative Example 102 | Comparative Example 103 | Comparative Example 104 | Comparative Example 105 | Comparative Example 106 | Comparative Example 107 | Comparative Example 108 |
|---|---|---|---|---|---|---|---|---|---|---|
| Graft copolymer | I-1 | parts by weight | 0 | 0 | 0 | 0 | 0 | 0 | 0 | 0 |
|  | I-2 | parts by weight | 0 | 0 | 0 | 0 | 0 | 0 | 0 | 0 |
|  | I-3 | parts by weight | 0 | 0 | 0 | 0 | 0 | 0 | 0 | 0 |
|  | I-4 | parts by weight | 0 | 0 | 0 | 0 | 0 | 0 | 0 | 0 |
|  | I-5 | parts by weight | 0 | 0 | 0 | 0 | 0 | 0 | 0 | 0 |
|  | I-6 | parts by weight | 0 | 0 | 0 | 0 | 0 | 0 | 0 | 0 |
|  | I-7 | parts by weight | 50 | 0 | 0 | 0 | 0 | 0 | 0 | 0 |
|  | I-8 | parts by weight | 0 | 50 | 0 | 0 | 0 | 0 | 0 | 0 |
|  | I-9 | parts by weight | 0 | 0 | 50 | 0 | 0 | 0 | 0 | 0 |
|  | I-10 | parts by weight | 0 | 0 | 0 | 50 | 0 | 0 | 0 | 0 |
|  | I-11 | parts by weight | 0 | 0 | 0 | 0 | 50 | 0 | 0 | 0 |
|  | I-12 | parts by weight | 0 | 0 | 0 | 0 | 0 | 50 | 0 | 0 |
|  | I-13 | parts by weight | 0 | 0 | 0 | 0 | 0 | 0 | 50 | 0 |
|  | I-14 | parts by weight | 0 | 0 | 0 | 0 | 0 | 0 | 0 | 50 |
| Vinyl-based copolymer | II-1 | parts by weight | 50 | 50 | 50 | 50 | 50 | 50 | 50 | 50 |
|  | II-2 | parts by weight | 0 | 0 | 0 | 0 | 0 | 0 | 0 | 0 |
| Impact resistance (Charpy Impact Strength) |  | kJ/m² | 6 | 7 | 9 | 9 | 10 | 11 | 9 | 25 |
| Fluidity (MFR) |  | g/10 min | 29 | 14 | 18 | 22 | 16 | 12 | 22 | 17 |
| Weather resistance (ΔE) |  |  | — | 2.1 | 2.9 | 2.5 | 2.4 | 2.3 | 2.6 | 2.5 | 5.8 |
| Flame retardancy (thickness: 1.5 mm) |  |  | — | NG | NG | NG | NG | NG | NG | NG | NG |
| Aggregated state |  |  | — | y | n | n | y | y | n | y | n |
| Average aggregated particle size |  | μm | 0.39 | — | — | 0.59 | 0.63 | — | 0.78 | — |

(Reference Example 18) Flame Retardant (III)

Flame Retardant (III-1)
A brominated epoxy oligomer "PLATHERM" (registered trademark) EP-16 (bromine content: 50% by weight; with epoxy on both ends) manufactured by DIC Corporation was provided.

Flame Retardant (III-2)
A brominated epoxy oligomer "PLATHERM" (registered trademark) EC-20 (bromine content: 56% by weight; modified with tribromophenol at both ends) manufactured by DIC Corporation was provided.

Flame Retardant (III-3)
A brominated triazine compound "PYROGUARD" (registered trademark) SR-245 (bromine content: 67% by weight) manufactured by DKS Co. Ltd was provided.

(Reference Example 19) Flame-Retardant Auxiliary (IV)

Antimony trioxide "PATOX" (registered trademark) M (purity: 99% or more; average particle size: 0.5 μm) manufactured by NIHON SEIKO CO., LTD. was provided.

Examples 201 to 209 and Comparative Examples 201 to 210

The graft copolymers (I-1, I-3, I-5 to I-11 and I-14 and I-15) prepared in Reference Examples 1, 3, 5 to 11, 14 and 15, the vinyl-based polymers (II-1 and II-2) prepared in Reference Examples 16 and 17, the flame retardants (III-1 to 111-3) in Reference Example 18 and the flame-retardant auxiliary (IV) in Reference Example 19 were blended at a blending ratio as shown in Tables 4 and 5, 0.8 parts by weight of amide ethylenebisstearate, 0.3 parts by weight of a light stabilizer (""ADEKA STAB" (registered trademark) LA-77Y" manufactured by ADEKA CORPORATION) and 0.3 parts by weight of an ultraviolet absorber (""ADEKA STAB" LA-32" manufactured by ADEKA CORPORATION) were added, and the mixture was mixed at 23° C. using a Henschel mixer. Further, in Examples 201 to 207 and Comparative Examples 201 to 208, 0.3 parts by weight of a drip preventing agent (""POLYFLON" (registered trademark) PTFE D-210C" manufactured by DAIKIN INDUSTRIES, Ltd.) was added and mixed. The obtained mixture was melted and kneaded at an extrusion temperature of 230° C. and extruded in the form of a gut by a 40 mmφ extruder, and pelletized. The obtained pellet was injection-molded at a molding temperature of 230° C. and a mold temperature of 60° C. to prepare various kinds of test pieces for evaluation. The results of making evaluations for the test pieces using the above-mentioned methods are shown in Tables 4 and 5. The transmission electron microscope photographs of the thermoplastic resin compositions obtained in Example 207 and Comparative Example 202 are shown in FIGS. 3 and 4, respectively.

TABLE 4

|  |  |  | Example 201 | Example 202 | Example 203 | Example 204 | Example 205 | Example 206 | Example 207 | Example 208 | Example 209 |
|---|---|---|---|---|---|---|---|---|---|---|---|
| Graft copolymer | I-1 | parts by weight | 50 | 50 | 40 | 60 | 0 | 0 | 0 | 50 | 50 |
|  | I-3 | parts by weight | 0 | 0 | 0 | 0 | 50 | 0 | 0 | 0 | 0 |
|  | I-5 | parts by weight | 0 | 0 | 0 | 0 | 0 | 50 | 0 | 0 | 0 |
|  | I-6 | parts by weight | 0 | 0 | 0 | 0 | 0 | 0 | 50 | 0 | 0 |
|  | I-7 | parts by weight | 0 | 0 | 0 | 0 | 0 | 0 | 0 | 0 | 0 |
|  | I-8 | parts by weight | 0 | 0 | 0 | 0 | 0 | 0 | 0 | 0 | 0 |
|  | I-9 | parts by weight | 0 | 0 | 0 | 0 | 0 | 0 | 0 | 0 | 0 |

TABLE 4-continued

|  |  |  | Example 201 | Example 202 | Example 203 | Example 204 | Example 205 | Example 206 | Example 207 | Example 208 | Example 209 |
|---|---|---|---|---|---|---|---|---|---|---|---|
|  | I-10 | parts by weight | 0 | 0 | 0 | 0 | 0 | 0 | 0 | 0 | 0 |
|  | I-11 | parts by weight | 0 | 0 | 0 | 0 | 0 | 0 | 0 | 0 | 0 |
|  | I-14 | parts by weight | 0 | 0 | 0 | 0 | 0 | 0 | 0 | 0 | 0 |
|  | I-15 | parts by weight | 0 | 0 | 0 | 0 | 0 | 0 | 50 | 0 | 0 |
| Vinyl-based | II-1 | parts by weight | 50 | 50 | 60 | 40 | 50 | 50 | 50 | 25 | 25 |
| copolymer | II-2 | parts by weight | 0 | 0 | 0 | 0 | 0 | 0 | 0 | 25 | 25 |
| Flame retartdant | III-1 | parts by weight | 25 | 0 | 22 | 28 | 25 | 25 | 25 | 12 | 0 |
|  | III-2 | parts by weight | 0 | 25 | 0 | 0 | 0 | 0 | 0 | 0 | 0 |
|  | III-3 | parts by weight | 0 | 0 | 0 | 0 | 0 | 0 | 0 | 0 | 13 |
| Flame-retardant auxiliary | IV | parts by weight | 6 | 6 | 6 | 6 | 6 | 6 | 6 | 3 | 0 |
| Impact resistance (Charpy Impact Strength) |  | kJ/m$^2$ | 14 | 14 | 8 | 18 | 13 | 8 | 13 | 22 | 25 |
| Fluidity (MFR) |  | g/10 min | 41 | 39 | 50 | 35 | 42 | 36 | 36 | 28 | 34 |
| Weather resistance (ΔE) |  | — | 1.7 | 3.2 | 1.5 | 2.3 | 1.9 | 2.4 | 1.5 | 1.2 | 1.8 |
| Flame retardancy (thickness: 1.5 mm) |  | — | V-0 | V-0 | V-0 | V-0 | V-0 | V-0 | V-0 | V-2 | V-2 |
| Aggregated state |  | — | y | y | y | y | y | y | y | y | y |
| Average aggregated particle size |  | μm | 0.33 | 0.33 | 0.28 | 0.38 | 0.36 | 0.32 | 0.48 | 0.32 | 0.33 |

TABLE 5

|  |  |  | Comparative Example 201 | Comparative Example 202 | Comparative Example 203 | Comparative Example 204 | Comparative Example 205 | Comparative Example 206 | Comparative Example 207 | Comparative Example 208 | Comparative Example 209 | Comparative Example 210 |
|---|---|---|---|---|---|---|---|---|---|---|---|---|
| Graft copolymer | I-1 | parts by weight | 0 | 0 | 0 | 0 | 0 | 0 | 0 | 0 | 0 | 0 |
|  | I-3 | parts by weight | 0 | 0 | 0 | 0 | 0 | 0 | 0 | 0 | 0 | 0 |
|  | I-5 | parts by weight | 0 | 0 | 0 | 0 | 0 | 0 | 0 | 0 | 0 | 0 |
|  | I-6 | parts by weight | 0 | 0 | 0 | 0 | 0 | 0 | 0 | 0 | 0 | 0 |
|  | I-7 | parts by weight | 50 | 0 | 0 | 0 | 0 | 0 | 0 | 0 | 0 | 0 |
|  | I-8 | parts by weight | 0 | 50 | 0 | 0 | 0 | 0 | 0 | 0 | 0 | 0 |
|  | I-9 | parts by weight | 0 | 0 | 50 | 0 | 0 | 0 | 0 | 0 | 0 | 0 |
|  | I-10 | parts by weight | 0 | 0 | 0 | 50 | 0 | 0 | 0 | 0 | 0 | 0 |
|  | I-11 | parts by weight | 0 | 0 | 0 | 0 | 50 | 0 | 0 | 0 | 0 | 0 |
|  | I-14 | parts by weight | 0 | 0 | 0 | 0 | 0 | 50 | 0 | 0 | 0 | 0 |
|  | I-15 | parts by weight | 0 | 0 | 0 | 0 | 0 | 0 | 50 | 50 | 50 | 50 |
| Vinyl-based | II-1 | parts by weight | 50 | 50 | 50 | 50 | 50 | 50 | 50 | 50 | 25 | 25 |
| copolymer | II-2 | parts by weight | 0 | 0 | 0 | 0 | 0 | 0 | 0 | 0 | 25 | 25 |
| Flame retartdant | III-1 | parts by weight | 25 | 25 | 25 | 25 | 25 | 25 | 25 | 0 | 12 | 0 |
|  | III-2 | parts by weight | 0 | 0 | 0 | 0 | 0 | 0 | 0 | 25 | 0 | 0 |
|  | III-3 | parts by weight | 0 | 0 | 0 | 0 | 0 | 0 | 0 | 0 | 0 | 13 |
| Flame-retardant auxiliary | IV | parts by weight | 6 | 6 | 6 | 6 | 6 | 6 | 6 | 6 | 3 | 0 |
| Impact resistance (Charpy Impact Strength) |  | kJ/m$^2$ | 4 | 5 | 6 | 6 | 7 | 17 | 19 | 19 | 25 | 28 |
| Fluidity (MFR) |  | g/10 min | 49 | 34 | 38 | 42 | 36 | 37 | 34 | 33 | 23 | 28 |
| Weather resistance (ΔE) |  | — | 1.6 | 2.6 | 2.4 | 2.3 | 2.3 | 3.3 | 4.2 | 7.9 | 3.5 | 3.8 |
| Flame retardancy (thickness: 1.5 mm) |  | — | V-0 | V-0 | V-0 | V-0 | V-0 | V-0 | V-0 | V-0 | V-2 | V-2 |
| Aggregated state |  | — | y | n | n | y | y | n | n | n | n | n |
| Average aggregated particle size |  | μm | 0.39 | — | — | 0.59 | 0.63 | — | — | — | — | — |

INDUSTRIAL APPLICABILITY

The thermoplastic resin composition of the present invention is excellent in fluidity, and ensures that a molded article excellent in weather resistance and impact resistance can be obtained. By taking advantage of these properties, molded articles obtained from the thermoplastic resin composition can be suitably used in outdoor equipment and automobile applications where weather resistance and impact resistance are required.

DESCRIPTION OF REFERENCE SIGNS

1 Graft copolymer primary particles
2 Graft copolymer aggregated particles
3 Vinyl-based copolymer

The invention claimed is:
1. A thermoplastic resin composition comprising:
a graft copolymer (I) obtained by graft-polymerizing a monomer mixture (B) containing an aromatic vinyl-based monomer and a vinyl cyanide-based monomer in the presence of an acryl-based rubbery polymer (A) which is obtained by copolymerizing 97 to 99.3% by weight of an acrylic acid ester-based monomer (a) and 0.7 to 3% by weight of a polyfunctional monomer (b) and has a volume average particle size of 0.10 to 0.3 μm; and
a vinyl-based copolymer (II) obtained by copolymerizing at least an aromatic vinyl-based monomer and a vinyl cyanide-based monomer,
the thermoplastic resin composition containing 30 to 70 parts by weight of the graft copolymer (I) and 30 to 70 parts by weight of the vinyl-based copolymer (II) based on 100 parts by weight of the total of the graft copolymer (I) and the vinyl-based copolymer (II), wherein the graft copolymer (I) satisfies the following formula (1) for the ratio of a gel swelling degree ($\alpha$) of the acryl-based rubbery polymer (A) in toluene to a graft ratio ($\beta$) of the graft copolymer (I) (($\alpha$)/($\beta$)), and particles of the graft copolymer (I) are aggregated in the thermoplastic resin composition $$0.4 \leq (\alpha)/(\beta) \leq 2.0 \tag{1}.$$

2. The thermoplastic resin composition according to claim 1, wherein the gel swelling degree of the acryl-based rubbery polymer (A) in toluene is 10 or more times.

3. The thermoplastic resin composition according to claim 1, wherein the graft ratio of the graft copolymer (I) is 5 to 40%.

4. The thermoplastic resin composition according to claim 1, which comprises 1 part by weight or more of a flame retardant (III) based on 100 parts by weight of the total of the graft copolymer (I) and the vinyl-based copolymer (II).

5. The thermoplastic resin composition according to claim 4, wherein the flame retardant (III) contains an organic halogen compound.

6. The thermoplastic resin composition according to claim 5, wherein the organic halogen compound contains a brominated epoxy resin and/or an oligomer thereof.

7. The thermoplastic resin composition according to claim 6, wherein the brominated epoxy resin and/or oligomer thereof have epoxy groups on both ends thereof.

8. A molded article, which is obtained by molding the thermoplastic resin composition according to claim 1.

9. The thermoplastic resin composition according to claim 1, wherein the aromatic vinyl-based monomer comprises one or more of styrene, $\alpha$-methylstyrene, p-methylstyrene, m-methylstyrene, o-methylstyrene and t-butylstyrene; and the vinyl cyanide-based monomer comprises one or more of acrylonitrile, methacrylonitrile and ethacrylonitrile.

10. The thermoplastic resin composition according to claim 9, wherein the acrylic acid ester-based monomer (a) comprises one or more of methyl acrylate, ethyl acrylate, n-butyl acrylate, t-butyl acrylate and octyl acrylate; and the polyfunctional monomer (b) comprises one or more of allyl acrylate, allyl methacrylate, diallyl maleate, triallyl cyanurate, triallyl isocyanurate, divinyl benzene, ethylene glycol dimethacrylate, diethylene glycol dimethacrylate, and propylene glycol dimethacrylate.

11. The thermoplastic resin composition according to claim 1, wherein the acrylic acid ester-based monomer (a) comprises one or more of methyl acrylate, ethyl acrylate, n-butyl acrylate, t-butyl acrylate and octyl acrylate; and the polyfunctional monomer (b) comprises one or more of allyl acrylate, allyl methacrylate, diallyl maleate, triallyl cyanurate, triallyl isocyanurate, divinyl benzene, ethylene glycol dimethacrylate, diethylene glycol dimethacrylate, and propylene glycol dimethacrylate.

* * * * *